US012656153B2

(12) United States Patent (10) Patent No.: US 12,656,153 B2

Laman et al. (45) Date of Patent: Jun. 16, 2026

(54) METROLOGY SYSTEM WITH POSITION AND ORIENTATION TRACKING UTILIZING PATTERNS OF LIGHT BEAMS

(71) Applicant: Mitutoyo Corporation, Kanagawa-ken (JP)

(72) Inventors: Norman Laman, Kenmore, WA (US); Nick Hartmann, Kirkland, WA (US)

(73) Assignee: Mitutoyo Corporation, Kangawa-Ken (JP)

( * ) Notice: Subject to any disclaimer, the term of this patent is extended or adjusted under 35 U.S.C. 154(b) by 380 days.

(21) Appl. No.: 18/542,087

(22) Filed: Dec. 15, 2023

(65) Prior Publication Data

US 2025/0198806 A1 Jun. 19, 2025

(51) Int. Cl.
G01D 5/30 (2006.01)
B25J 9/16 (2006.01)

(52) U.S. Cl.
CPC ............ G01D 5/305 (2013.01); B25J 9/1697 (2013.01)

(58) Field of Classification Search
CPC G01N 21/8806; G01B 11/005; G01B 11/007; G01B 11/0608
See application file for complete search history.

(56) References Cited

U.S. PATENT DOCUMENTS

| | | | |
|---|---|---|---|
| 4,574,199 A | * | 3/1986 | Pryor ................... G01B 11/007 |
| | | | 33/503 |
| 4,613,943 A | | 9/1986 | Miyake et al. |
| 4,725,965 A | | 2/1988 | Keenan |
| 4,831,549 A | | 5/1989 | Red et al. |

(Continued)

FOREIGN PATENT DOCUMENTS

| | | |
|---|---|---|
| CN | 110936373 A | 3/2020 |
| CN | 112070133 A | 12/2020 |

(Continued)

OTHER PUBLICATIONS

Hamamatsu, "iPMSEL," Jun. 2006, URL=https://www.hamamatsu.com/us/en/our-company/business-domain/central-research-laboratory/optical-materials/ipmsel.html, retrieved on Aug. 22, 2023. (12 pages).

(Continued)

*Primary Examiner* — Redhwan K Mawari

(74) *Attorney, Agent, or Firm* — Seed Intellectual Property Law Group LLP

(57) ABSTRACT

A metrology system is provided for use with a movement system that moves an end tool. The metrology system includes a sensor configuration, a light beam source configuration and a processing portion. The light beam source configuration directs a first pattern of light beams and a second pattern of light beams to light beam sensors to indicate a position and orientation of the light beam source configuration. The first pattern of light beams has a lower density of light beams as compared to the second pattern of light beams. Measurement signals from the light beam sensors are processed to determine a position and orientation of the light beam source configuration. The first pattern light beams and the second pattern light beams have at least one different characteristic (e.g., wavelength, polarity, timing, etc.) that enables the first pattern light beams to be distinguished from the second pattern light beams.

21 Claims, 17 Drawing Sheets

(56) References Cited

U.S. PATENT DOCUMENTS

| | | | |
|---|---|---|---|
| 5,086,401 | A | 2/1992 | Glassman et al. |
| 5,105,368 | A | 4/1992 | Alexandersen et al. |
| 5,297,238 | A | 3/1994 | Wang et al. |
| 5,617,335 | A | 4/1997 | Hashima et al. |
| 5,798,947 | A | 8/1998 | Ye et al. |
| 5,876,325 | A | 3/1999 | Mizuno et al. |
| 6,222,940 | B1 | 4/2001 | Wenzel et al. |
| 6,640,008 | B1 | 10/2003 | Lee et al. |
| 6,681,151 | B1 | 1/2004 | Weinzimmer et al. |
| 6,781,694 | B2 | 8/2004 | Nahum et al. |
| 6,937,349 | B2 | 8/2005 | Jones et al. |
| 7,105,753 | B1 | 9/2006 | Lapstun et al. |
| 7,532,949 | B2 | 5/2009 | Ban et al. |
| 7,845,560 | B2 | 12/2010 | Emanuel et al. |
| 8,111,905 | B2 * | 2/2012 | Campbell .......... G01N 21/8806 382/152 |
| 8,681,344 | B2 | 3/2014 | Spruck et al. |
| 8,773,526 | B2 * | 7/2014 | Bryll .................... G06V 10/145 348/94 |
| 8,792,963 | B2 | 7/2014 | Zhao et al. |
| 8,803,978 | B2 | 8/2014 | Wilson |
| 8,885,177 | B2 | 11/2014 | Ben-Yishai et al. |
| 8,981,324 | B2 | 3/2015 | Rigney et al. |
| 8,989,898 | B2 | 3/2015 | DeVlieg |
| 9,050,728 | B2 | 6/2015 | Ban et al. |
| 9,383,181 | B2 * | 7/2016 | Engel ..................... G01B 5/008 |
| 9,572,549 | B2 | 2/2017 | Belevich et al. |
| 9,797,706 | B2 | 10/2017 | Jordil et al. |
| 10,054,422 | B2 * | 8/2018 | Böckem .............. G01B 21/042 |
| 10,058,996 | B2 | 8/2018 | Hosek et al. |
| 10,099,380 | B2 | 10/2018 | Ishige et al. |
| 10,625,427 | B2 | 4/2020 | Troy et al. |
| 10,706,562 | B2 | 7/2020 | Haverkamp et al. |
| 10,751,883 | B2 | 8/2020 | Nahum |
| 10,871,366 | B2 | 12/2020 | Nahum |
| 10,913,156 | B2 | 2/2021 | Nahum et al. |
| 11,002,529 | B2 | 5/2021 | Nahum |
| 11,725,929 | B2 | 8/2023 | Haverkamp |
| 11,745,354 | B2 | 9/2023 | Atherton et al. |
| 12,174,005 | B2 | 12/2024 | Tobiason et al. |
| 2003/0144765 | A1 | 7/2003 | Habibi et al. |
| 2005/0168726 | A1 * | 8/2005 | Larkin ............... G01N 21/4133 356/135 |
| 2005/0219363 | A1 * | 10/2005 | Kohler ................... H04N 1/484 348/188 |
| 2005/0225278 | A1 | 10/2005 | Ban et al. |
| 2006/0017022 | A1 | 1/2006 | Rigney et al. |
| 2006/0256913 | A1 * | 11/2006 | Roberts ................. A61B 6/027 378/15 |
| 2007/0296366 | A1 | 12/2007 | Quaid et al. |
| 2009/0180667 | A1 | 7/2009 | Mahan et al. |
| 2009/0234502 | A1 | 9/2009 | Ueyama et al. |
| 2010/0331855 | A1 | 12/2010 | Zhao et al. |
| 2011/0029131 | A1 | 2/2011 | Ban et al. |
| 2011/0103679 | A1 * | 5/2011 | Campbell .......... G01N 21/8806 382/152 |
| 2013/0035791 | A1 | 2/2013 | Chiu et al. |
| 2013/0090554 | A1 | 4/2013 | Zvuloni et al. |
| 2013/0123982 | A1 | 5/2013 | Chiu et al. |
| 2013/0158947 | A1 | 6/2013 | Suzuki |
| 2014/0157610 | A1 | 6/2014 | Garvey et al. |
| 2014/0301632 | A1 | 10/2014 | Ikeda et al. |
| 2014/0343727 | A1 | 11/2014 | Calkins et al. |
| 2015/0158181 | A1 | 6/2015 | Kawamura et al. |
| 2016/0008988 | A1 | 1/2016 | Kennedy et al. |
| 2016/0039096 | A1 | 2/2016 | Wallack et al. |
| 2016/0136812 | A1 | 5/2016 | Hosek et al. |
| 2016/0151915 | A1 | 6/2016 | Nishi et al. |
| 2016/0223316 | A1 | 8/2016 | Jordil et al. |
| 2016/0291160 | A1 | 10/2016 | Zweigle et al. |
| 2017/0140521 | A1 | 5/2017 | Sakaguchi et al. |
| 2017/0148154 | A1 | 5/2017 | Nakao |
| 2017/0151671 | A1 | 6/2017 | Ishige et al. |
| 2017/0182665 | A1 | 6/2017 | Okuyama et al. |
| 2018/0004188 | A1 | 1/2018 | Yamaguchi et al. |
| 2018/0018778 | A1 | 1/2018 | Haverkamp et al. |
| 2018/0153437 | A1 | 6/2018 | Schwartz et al. |
| 2018/0272490 | A1 | 9/2018 | Brenner et al. |
| 2018/0279993 | A1 | 10/2018 | Crawford et al. |
| 2018/0361571 | A1 | 12/2018 | Georgeson et al. |
| 2018/0361595 | A1 | 12/2018 | Troy et al. |
| 2018/0373158 | A1 | 12/2018 | Baier et al. |
| 2019/0005600 | A1 | 1/2019 | Hazeyama |
| 2019/0015980 | A1 | 1/2019 | Kojima et al. |
| 2019/0056218 | A1 | 2/2019 | Ulmer et al. |
| 2019/0099887 | A1 | 4/2019 | Huang et al. |
| 2019/0195607 | A1 | 6/2019 | Nahum |
| 2019/0256300 | A1 | 8/2019 | Shimamura et al. |
| 2019/0291277 | A1 | 9/2019 | Oleynik |
| 2020/0094407 | A1 * | 3/2020 | Nahum .................. B25J 9/1664 |
| 2023/0099779 | A1 | 3/2023 | Redgewell et al. |
| 2023/0204340 | A1 | 6/2023 | Tobiason et al. |
| 2024/0044845 | A1 * | 2/2024 | Fleck ..................... G01N 29/28 |
| 2024/0219208 | A1 * | 7/2024 | Cook ........................ G01D 5/22 |
| 2024/0383369 | A1 * | 11/2024 | Irarrazaval .............. B60L 53/80 |
| 2024/0393295 | A1 * | 11/2024 | Jack ........................ G01N 29/46 |

FOREIGN PATENT DOCUMENTS

| | | |
|---|---|---|
| CN | 113390343 A | 9/2021 |
| DE | 10252647 A1 | 5/2004 |
| WO | WO 2011036033 A1 | 3/2011 |

OTHER PUBLICATIONS

Krajník et al., "External Localization System for Mobile Robotics," *16th International Conference on Advanced Robotics* (*ICAR*), Nov. 25-29, 2013, Montevideo, Uruguay. (6 Pages).

Nguyen et al., "A New Full Pose Measurement Method for Robot Calibration," Sensors 13(7): 9132-9147, 2013.

Pérez et al., "Robot Guidance Using Machine Vision Techniques in Industrial Environments: A Comparative Review," *Sensors* 16(3):335, 2016. (26 pages).

Scara, URL=https://en.wikipedia.org/w/index.php?title=SCARA&oldid=838861482, Archive Date Apr. 29, 2018. (2 pages).

* cited by examiner

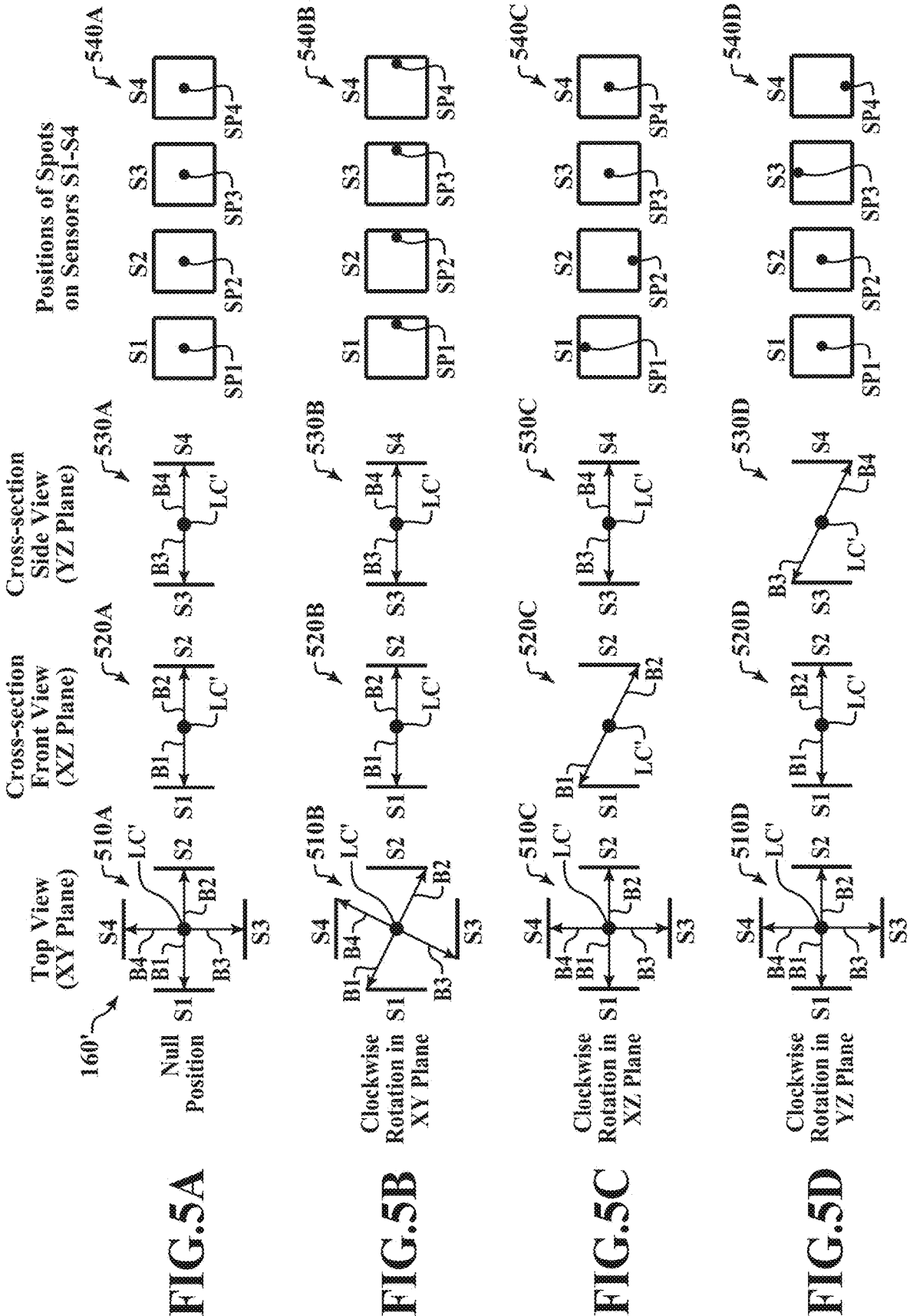

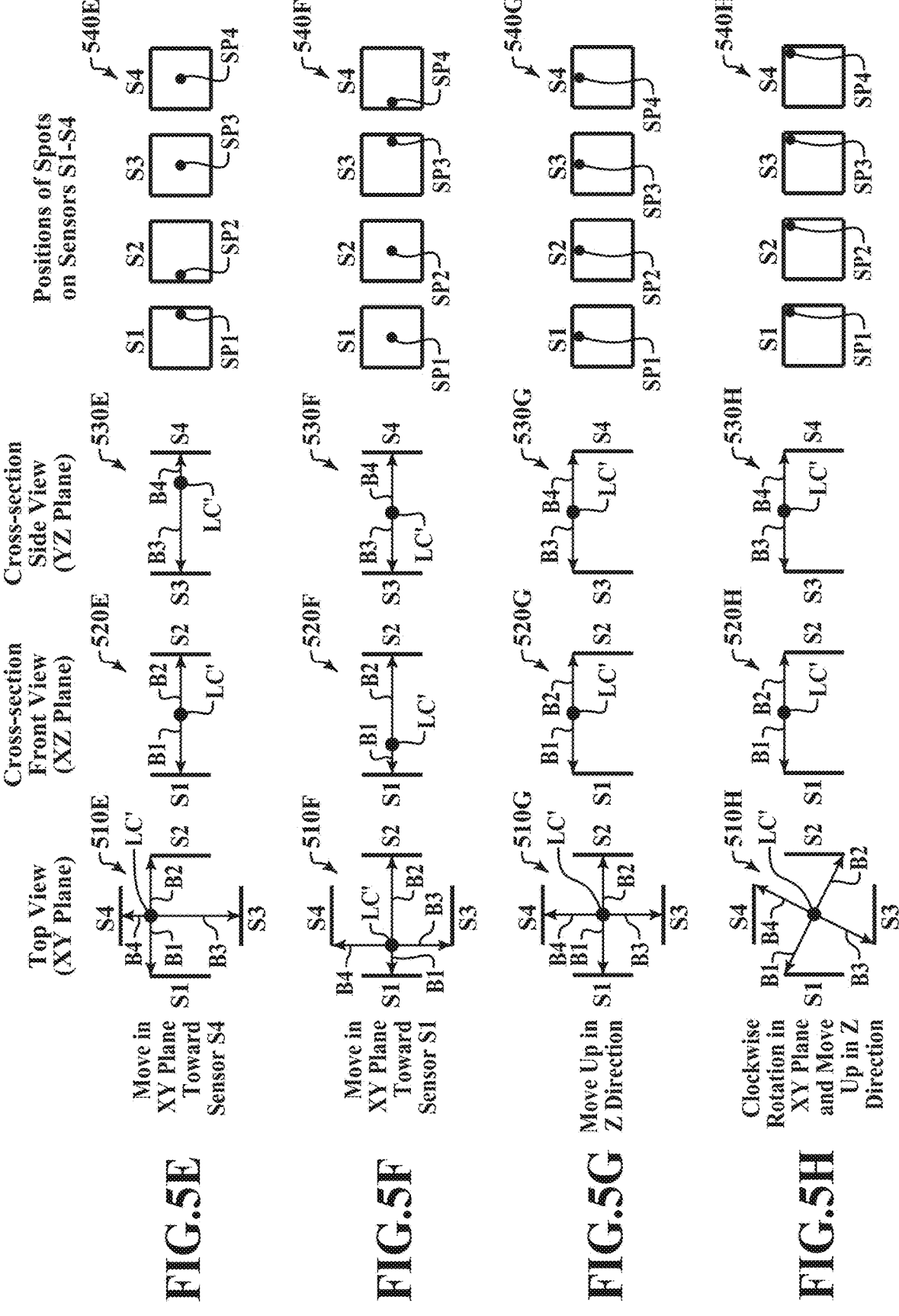

Start

1600

Operate light beam source configuration to direct a first pattern of light beams and a second pattern of light beams to light beam sensors of a sensor configuration to indicate a position and orientation of the light beam source configuration, wherein: the light beam source configuration is coupled to at least one of an end tool or an end tool mounting configuration of a movement system that moves the end tool; the position and orientation of the light beam source configuration are indicative of a position and orientation of the end tool; the sensor configuration comprises a plurality of light beam sensors located at fixed positions, including at least a first light beam sensor at a first position and a second light beam sensor at a second position; at least some light beams that are directed to and received at the light beam sensors produce measurement spots in positions on the light beam sensors that cause the light beam sensors to produce corresponding measurement signals; and the first pattern of light beams has a lower density of first pattern light beams in relation to the second pattern of light beams which has a higher density of second pattern light beams

1610

Process the measurement signals from the light beam sensors of the sensor configuration to determine a position and orientation of the light beam source configuration, wherein: for at least a first position of the light beam source configuration that is a first distance from the first light beam sensor and a second distance from the second light beam sensor, with the second distance being greater than the first distance: one or more first pattern light beams that are directed toward the first light beam sensor are utilized to cause the first light beam sensor to produce measurement signals for the processing to determine the position and orientation, and second pattern light beams that are directed toward the first light beam sensor are not utilized to cause the first light beam sensor to produce measurement signals for the processing to determine the position and orientation; and one or more second pattern light beams that are directed toward the second light beam sensor are utilized to cause the second light beam sensor to produce measurement signals for the processing to determine the position and orientation

1620

End

FIG.16

METROLOGY SYSTEM WITH POSITION AND ORIENTATION TRACKING UTILIZING PATTERNS OF LIGHT BEAMS

BACKGROUND

Technical Field

This disclosure relates to metrology and movement systems, and more particularly to a metrology system that may be utilized with a movement system, such as a robot, for tracking position and orientation.

Description of the Related Art

Manufacturing, workpiece inspection, and other processes frequently use mechanical movement systems for performing certain functions. For example, robot systems or other movement systems may be utilized to move an end tool for performing certain operations (e.g., in relation to workpiece inspection, manufacturing, etc.). For certain applications, various types of robots that may be utilized include articulated robots, selective compliance articulated robot arm (SCARA) robots, Cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.).

U.S. Pat. No. 4,725,965 (referred to herein as the '965 patent), which is hereby incorporated herein by reference in its entirety, discloses certain calibration techniques for improving the accuracy of a SCARA system. As described in the '965 patent, to calibrate a kinematic model, arm portions are placed in a first configuration to locate an end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated. As further described in the '965 patent, the calibration technique may include the use of certain cameras.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.). A system that can provide improvements with regard to such issues (e.g., for increasing the reliability, repeatability, speed, etc., of position and orientation determination for processes such as workpiece measurements, manufacturing, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a metrology system is provided for use with a movement system that moves an end tool. The movement system comprises a movable configuration and a motion control system. The movable configuration comprises an end tool mounting configuration that an end tool is configured to mount to. The motion control system is configured to control an end tool position and orientation, based at least in part on controlling the movable configuration so as to move at least a portion of an end tool that is mounted to the end tool mounting configuration within a movement volume.

The metrology system comprises a sensor configuration, a light beam source configuration and a processing portion. The sensor configuration comprises a plurality of light beam sensors located at fixed positions, including at least a first light beam sensor at a first position and a second light beam sensor at a second position. The light beam source configuration is configured to direct a first pattern of light beams and a second pattern of light beams to light beam sensors of the sensor configuration to indicate a position and orientation of the light beam source configuration.

The light beam source configuration is configured to be coupled to at least one of an end tool or the end tool mounting configuration. At least some of the light beams that are directed to and received at the light beam sensors are configured to produce measurement spots in positions on the light beam sensors that cause the light beam sensors to produce corresponding measurement signals. The first pattern of light beams has a lower density of first pattern light beams in relation to the second pattern of light beams which has a higher density of second pattern light beams. The processing portion is configured to process the measurement signals from the light beam sensors of the sensor configuration to determine a position and orientation of the light beam source configuration.

The metrology system is configured such that for at least a first position of the light beam source configuration that is a first distance from the first light beam sensor and a second distance from the second light beam sensor, with the second distance being greater than the first distance: one or more first pattern light beams that are directed toward the first light beam sensor are utilized to cause the first light beam sensor to produce measurement signals for the processing by the processing portion, and second pattern light beams that are directed toward the first light beam sensor are not utilized to cause the first light beam sensor to produce measurement signals for the processing by the processing portion (e.g., wherein in various implementations the second pattern light beams and/or signals produced thereby are at least one of blocked, filtered, not selected, or otherwise not utilized); and one or more second pattern light beams that are directed toward the second light beam sensor are utilized to cause the second light beam sensor to produce measurement signals for the processing by the processing portion. In various implementations, the first pattern light beams and the second pattern light beams have at least one different characteristic (e.g., wavelength, polarity, timing, etc.) that enables the first pattern light beams to be distinguished from the second pattern light beams.

According to another aspect, a method is provided for operating the metrology system including the light beam source configuration. The method includes operating the light beam source configuration to direct a first pattern of light beams and a second pattern of light beams to light beam sensors of a sensor configuration to indicate a position and orientation of the light beam source configuration. The first pattern of light beams has a lower density of first pattern light beams in relation to the second pattern of light beams which has a higher density of second pattern light beams. The method further includes processing the measurement signals from the light beam sensors of the sensor configuration to determine a position and orientation of the light beam source configuration, wherein: for at least a first position of the light beam source configuration that is a first distance from the first light beam sensor and a second distance from the second light beam sensor, with the second distance being greater than the first distance: one or more first pattern light beams that are directed toward the first light beam sensor are utilized to cause the first light beam sensor to produce measurement signals for the processing to determine the position and orientation, and second pattern light beams that are directed toward the first light beam sensor are not utilized to cause the first light beam sensor to produce measurement signals for the processing to determine the position and orientation (e.g., wherein in various implementations the second pattern light beams and/or signals produced thereby are at least one of blocked, filtered, not selected, or otherwise not utilized); and one or more second pattern light beams that are directed toward the second light beam sensor are utilized to cause the second light beam sensor to produce measurement signals for the processing to determine the position and orientation.

In various implementations, the method further includes receiving position information from the movement system that moves the end tool, wherein the position information from the movement system indicates with movement system accuracy a first distance of the light beam source configuration from the first light beam sensor, and based at least in part on the first distance as indicated by position information from the movement system, the second pattern light beams that are directed toward the first light beam sensor are not utilized to cause the first light beam sensor to produce measurement signals for the processing to determine the position and orientation.

BRIEF DESCRIPTION OF THE SEVERAL VIEWS OF THE DRAWINGS

FIGS. 5A-5H are diagrams illustrating four example light beams of a light beam source configuration and corresponding measurement spots on four sensors of a sensor configuration for different positions and orientations of the light beam source configuration;

FIG. 16 is a flow diagram illustrating one exemplary implementation of a routine for operating a metrology system.

DETAILED DESCRIPTION

Figure 1:
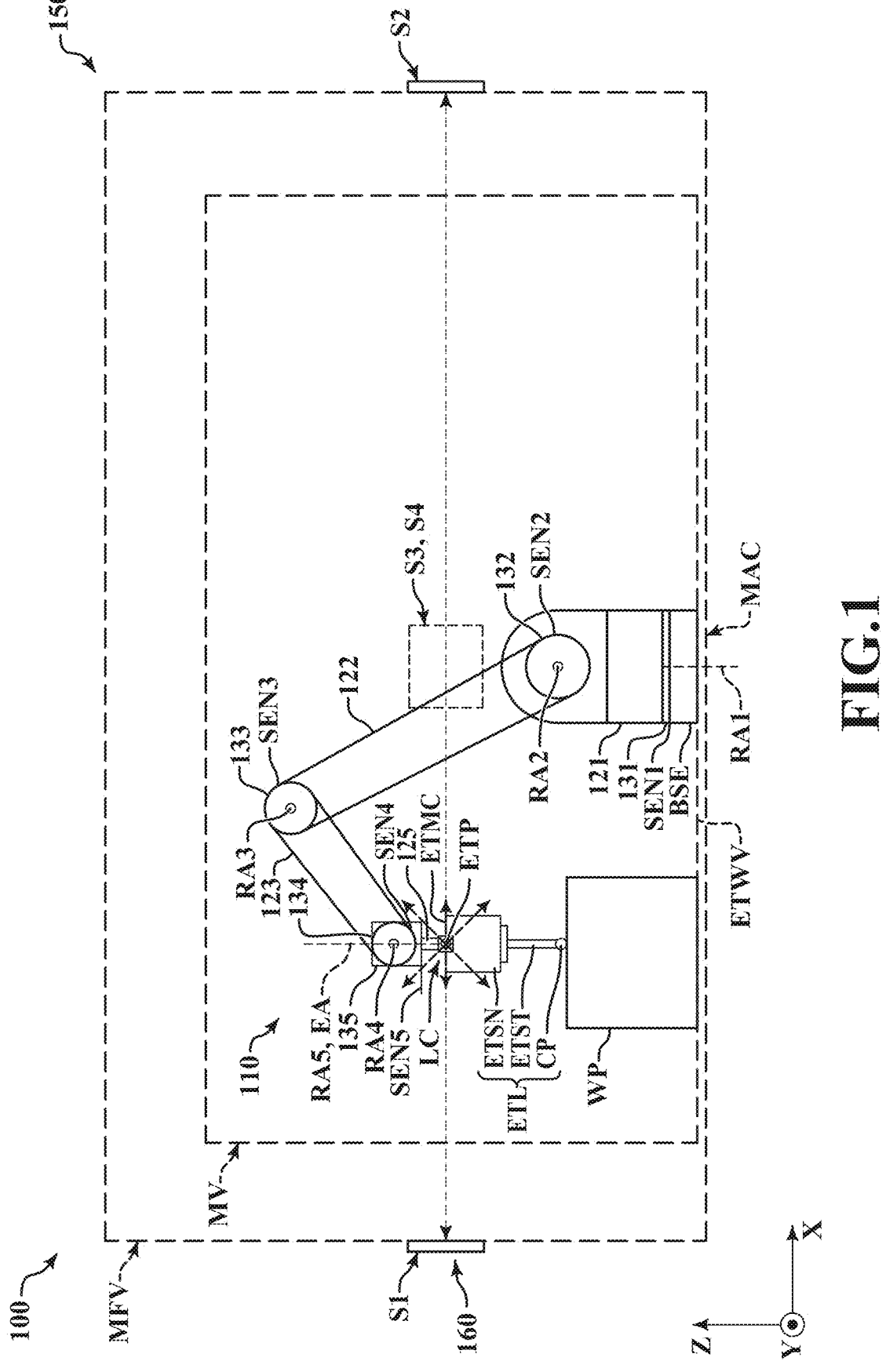
FIG. 1 is a block diagram of a first exemplary implementation of a movement and metrology system.

FIG. 1 is a block diagram of a first exemplary implementation of a movement and metrology system 100 including a movement system 110 and a metrology system 150. The movement system 110 (e.g., an articulated robot) includes a movable configuration MAC (e.g., a movable arm configuration) and a motion control and processing system 140. The metrology system 150 includes a sensor configuration 160, a light beam source configuration LC, and a metrology system position and orientation processing portion 190. In the configuration of FIG. 1, the light beam source configuration LC (e.g., illustrated as directing arrowed light beams in different directions, including toward the light beam sensors S1 and S2) is coupled to the end tool ETL. As will be described in more detail below, the metrology system 150 may be utilized for tracking a position and orientation (e.g., of the end tool ETL as moved by the movement system 110).

In the example of FIG. 1, the movable configuration MAC includes a lower base portion BSE, arm portions 121-125, motion mechanisms 131-135, position sensors SEN1-SEN5, and an end tool mounting configuration ETMC. In various implementations, some or all of the arm portions 121-125 may be mounted to respective motion mechanisms 131-135 at respective proximal ends of the respective arm portions 121-125. In the example of FIG. 1, some or all of the motion mechanisms 131-135 (e.g., rotary joints with corresponding motors) may enable motion (e.g., rotation) of the respective arm portions 121-125 (e.g., about respective rotary axes RA1-RA5). In various implementations, the position sensors SEN1-SEN5 (e.g., rotary encoders) may be utilized for determining the positions (e.g., angular orientations) of the respective arm portions 121-125.

In various implementations, the movable configuration MAC may have a portion that is designated as a terminal portion (e.g., the fifth arm portion 125). In the example configuration of FIG. 1, the end tool mounting configuration ETMC is located proximate to (e.g., located at) the distal end of the fifth arm portion 125 (e.g., designated as the terminal portion), which corresponds to a distal end of the movable configuration MAC. In various alternative implementations, a terminal portion of a movable configuration may be an element (e.g., a rotatable element, etc.) that is not an arm portion but for which at least part of the terminal portion corresponds to a distal end of the movable configuration where the end tool mounting configuration ETMC is located.

In various implementations, the end tool mounting configuration ETMC may include various elements for coupling and maintaining the end tool ETL proximate to the distal end of the movable configuration MAC. For example, in various implementations, the end tool mounting configuration ETMC may include an autojoint connection, a magnetic coupling portion and/or other coupling elements as are known in the art for mounting an end tool ETL to a corresponding element. The end tool mounting configuration ETMC may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and an end tool stylus ETST with a contact point CP (e.g., for contacting a surface of a workpiece WP). The fifth motion mechanism 135 is located proximate to the distal end of the fourth arm portion 124. In various implementations, the fifth motion mechanism 135 (e.g., a rotary joint with a corresponding motor) may be configured to rotate the fifth arm portion 125 about a rotary axis RA5. In some implementations, the fifth motion mechanism 135 may also or alternatively include a different type of motion mechanism (e.g., a linear actuator) that is configured to move the fifth arm portion 125 linearly (e.g., up and down). In any case, the end tool ETL is mounted to (e.g., coupled to) the end tool mounting configuration ETMC, and has a corresponding end tool position ETP with corresponding coordinates (e.g., x, y and z coordinates). In various implementations, the end tool position ETP may correspond to or be proximate to the position of the end tool mounting configuration ETMC (e.g., at or proximate to the distal end DE5 of the fifth arm portion 125, which may correspond to the distal end of the movable configuration MAC).

Figure 2:
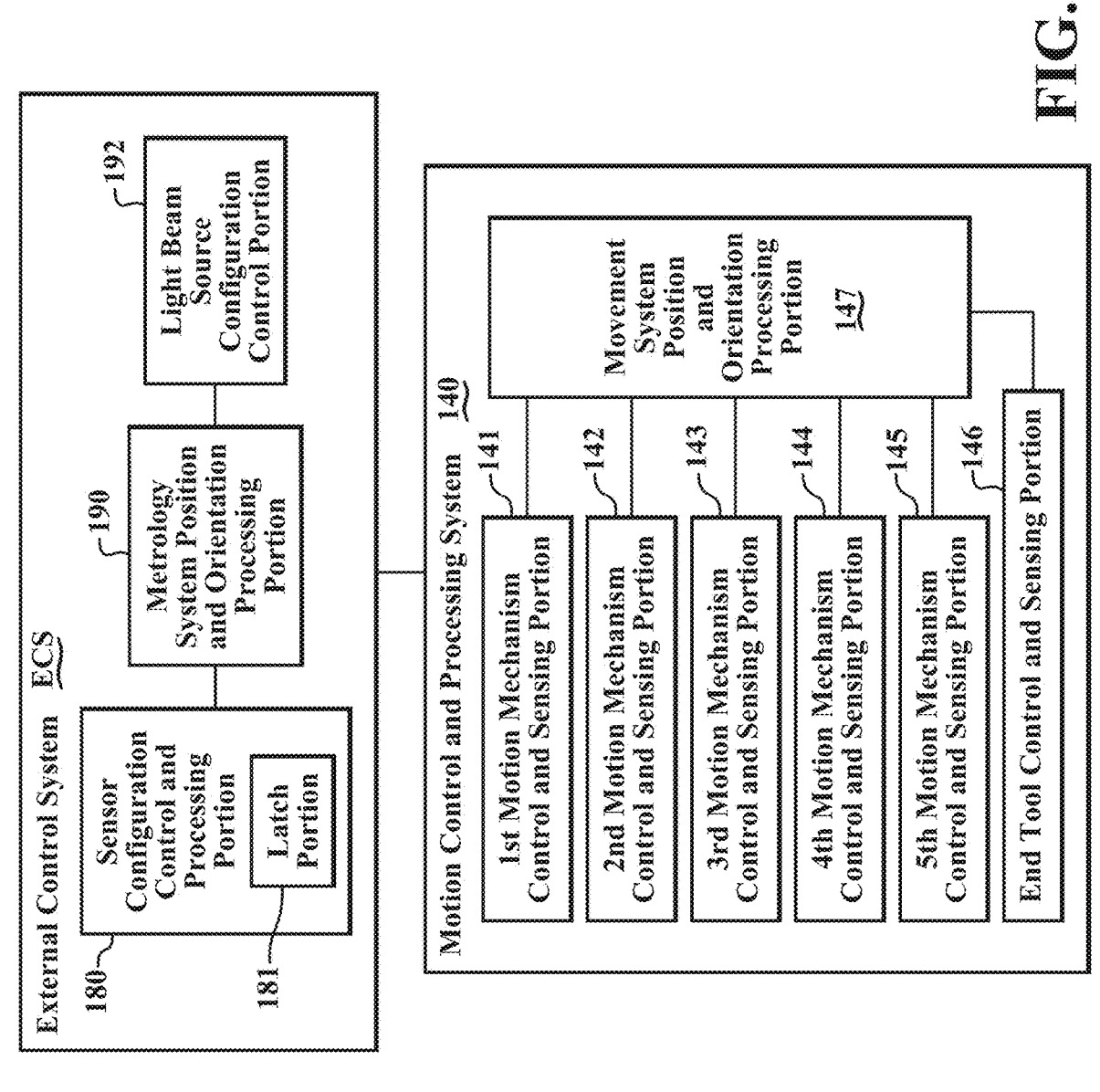
FIG. 2 is a block diagram of control and processing portions of the system of FIG. 1.

FIG. 2 is a block diagram of control and processing portions 200 of the system of FIG. 1, which include a motion control system 140 (e.g., which may also be a processing system) and which include at least portions of an external control system ECS. The motion control and processing system 140 is configured to control the end tool position ETP of the end tool ETL with a level of accuracy defined as a movement system accuracy. More specifically, the motion control and processing system 140 is generally configured to control the coordinates (e.g., x, y and z coordinates) of the end tool position ETP with the movement system accuracy based at least in part on utilizing the motion mechanisms 131-135 and position sensors SEN1-SEN5 for sensing and controlling the positions of the arm portions 121-125. In various implementations, the motion control and processing system 140 may include motion mechanism control and sensing portions 141-145 that may respectively receive signals from the respective position sensors SEN1-SEN5, for sensing the positions (e.g., angular positions, linear positions, etc.) of the respective arm portions 121-125, and/or may provide control signals to the respective motion mechanisms 131-135 (e.g., including motors, linear actuators, etc.) for moving the respective arm portions 121-125.

The motion control and processing system 140 may also receive signals from the end tool sensing portion ETSN. In various implementations, the end tool sensing portion ETSN may include circuitry and/or configurations related to the operations of the end tool ETL (e.g., for sensing a workpiece WP, etc.) As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN, which may provide corresponding signals to the motion control and processing system 140. In various implementations, the motion control and processing system 140 may include an end tool control and sensing portion 146 that may provide control signals to and/or receive sensing signals from the end tool sensing portion ETSN. In various implementations, the end tool control and sensing portion 146 and the end tool sensing portion ETSN may be merged and/or indistinguishable. In various implementations, the motion mechanism control and sensing portions 141-145 and the end tool control and sensing portion 146 may all provide outputs to and/or receive control signals from a movement system position and orientation processing portion 147 which may control and/or determine the overall positioning and orientation of the movable configuration MAC of the movement system 110 and corresponding position and orientation of the end tool ETL as part of the motion control and processing system 140. In various implementations, the position of the end tool ETL may be referenced as the end tool position ETP. In general, the motion control system 140 is configured to control the end tool position and orientation, based at least in part on controlling the movable configuration MAC so as to move at least a portion of the end tool ETL that is mounted to the end tool mounting configuration ETMC within a movement volume MV.

In various implementations, the metrology system 150 may be included with or otherwise added to a movement system 110 (e.g., as part of a retrofit configuration for being added to an existing movement system 110, etc.). In general, the metrology system 150 may be utilized to provide a determination of the position and orientation of the end tool ETL (e.g., with an improved level of accuracy relative to the accuracy of the movement system 110). More specifically, as will be described in more detail below, the metrology system 150 may be utilized to determine a relative position that is indicative of the metrology position coordinates of the end tool position ETP and an orientation of the end tool ETL, with an accuracy level that is better than the movement system accuracy.

In various implementations, the sensor configuration 160 of the metrology system 150 includes light beam sensors S1-S4. In FIG. 1, the light beam sensors S1 and S2 are shown on the far left and right in the illustrated cross-sectional view, respectively, and the general positions of the light beam sensors S3 and S4 (e.g., which would be located out of and into the page, respectively) are indicated by a dotted line representation. As will be described in more detail below, FIG. 4A illustrates a three dimensional view of a sensor configuration 160-4A with four light beam sensors and a similar structure as the sensor configuration 160 of FIG. 1.

The light beam sensors S1-S4 are located at fixed positions (e.g., as may each be located on a frame, wall or other structure, etc.) which at least in part define a metrology frame volume MFV. The metrology frame volume MFV is configured to be located around at least part of the movement volume MV (e.g., in which the at least part of the end tool ETL is moved by the movement system 110). The light beam source configuration LC is configured to be operated (e.g., by a light beam source configuration control portion 192) to direct light beams to the light beam sensors S1-S4 of the sensor configuration 160 (e.g., to indicate a position and orientation of the light beam source configuration LC).

The light beam source configuration LC is configured to be coupled to at least one of the end tool ETL or the end tool mounting configuration ETMC. It will be appreciated that when the end tool ETL is coupled to the end tool mounting configuration ETMC, the light beam source configuration LC is then coupled to both the end tool ETL and the end tool mounting configuration ETMC. The position and orientation of the light beam source configuration LC are indicative of the position and orientation of the end tool ETL. As will be described in more detail below with respect to FIGS. 5A-5H, the light beams that are directed to the light beam sensors S1-S4 are configured to produce measurement spots SP in positions on the light beam sensors that cause the light beam sensors to produce corresponding measurement signals. The metrology system position and orientation processing portion 190 is configured to process the measurement signals from the light beam sensors S1-S4 of the sensor configuration 160, wherein the measurement signals from the light beam sensors S1-S4 indicate the position and orientation of the light beam source configuration LC, and correspondingly of the end tool ETL.

In various implementations, the movement volume MV consists of a volume in which at least a portion of at least one of the end tool ETL and/or the light beam source configuration LC may be moved. In the example of FIG. 1, the movement volume MV is illustrated as including a volume in which the contact point CP of the end tool ETL may be moved when inspecting a workpiece. As one alternative example, a movement volume may alternatively include a volume in which the light beam source configuration LC may move when the end tool ETL is moved for inspecting a workpiece. In various implementations, the movement system 110 is configured to move the movable configuration MAC so as to move at least a portion of an end tool ETL (e.g., including the contact point CP) that is mounted to the end tool mounting configuration ETMC along at least two dimensions (e.g., x and y dimensions) in the movement volume MV. In the example of FIG. 1, the portion of the end tool ETL (e.g., the contact point CP) is movable by the movement system 110 along three dimensions (e.g., x, y and z dimensions).

In various implementations, a latch portion 181 and/or the metrology system position and orientation processing portion 190 and/or the light beam source configuration control portion 192 may be included as part of an external control system ECS (e.g., as part of an external computer, etc.) The light beam source configuration control portion 192 may provide power and/or control signals to the light beam source configuration LC and/or portions thereof (e.g., to one or more light beam sources of the light beam source configuration LC, etc.) The latch portion 181 may be included as part of a sensor configuration control and processing portion 180 (e.g., which may provide power and/or receive measurement signals from and/or provide control signals to the light beam sensors S1-S4 of the sensor configuration 160, and which may provide such signals and/or other signals to and from the metrology system position and orientation processing portion 190).

In various implementations, the latch portion 181 is configured to input at least one input signal that is related to the end tool position ETP and to determine the timing of a trigger signal based on the at least one input signal, and to output the trigger signal to at least one of the metrology system position and orientation processing portion 190 or the light beam sensors S1-S4 of the sensor configuration 160. In various implementations, the metrology system position and orientation processing portion 190 and/or the sensor configuration 160 are configured to determine current measurement signals from the light beam sensors S1-S4 (e.g., as corresponding to a current position and orientation of the light beam source configuration LC and/or end tool ETL) in response to receiving the trigger signal. In various implementations, the metrology system position and orientation processing portion 190 is configured to process the measurement signals as corresponding to the timing of the trigger signal to determine a position and orientation of the light beam source configuration LC and/or end tool ETL at the time of the trigger signal.

In various implementations, once a position and orientation of the light beam source configuration LC is determined, the position and orientation of the end tool may correspondingly be determined (e.g., in accordance with known geometric relationships, relative positioning, offsets etc. between the light beam source configuration LC and the end tool ETL). In various implementations, the light beam source configuration LC may be directly attached to the end tool ETL, or attached at or very close to the end tool mounting configuration (e.g., such that there is minimal or no separation between the end tool ETL and the light beam source configuration LC). In the implementation of FIG. 1, the light beam source configuration LC is illustrated as being at, or at least proximate to, the end tool position ETP (e.g., a designated reference position for the end tool ETL). Such configurations may reduce the complexity and/or otherwise improve the accuracy of a determination of the position and orientation of the end tool ETL as calculated in relation to a determined position and orientation of the light beam source configuration LC.

In various implementations, the determination of the position and orientation of the end tool ETL may further be utilized for determining certain additional position information (e.g., for determining the position of the contact point CP). As noted above, in various implementations, measurements of a workpiece surface may be determined by touching a contact point CP of an end tool ETL to a workpiece surface. In relation to such measurements, both the position and orientation of the end tool ETL may be determined, which may correspondingly indicate the position of the contact point CP.

In various implementations, different types of end tools ETL may provide different types of outputs that may be utilized with respect to the latch portion 181. For example, in an implementation where the end tool ETL is a touch probe that is used for measuring a workpiece and that outputs a touch signal when it touches the workpiece (e.g., when the contact point CP contacts the workpiece), the latch portion 181 may be configured to input that touch signal or a signal derived therefrom as the at least one input signal that the timing of a trigger signal is determined based on. In various implementations where the end tool ETL is a touch probe, a central axis of the touch probe may correspond to an end tool axis EA. As another example, in an implementation where the end tool ETL is a scanning probe that is used for measuring a workpiece and that provides respective workpiece measurement sample data corresponding to a respective sample timing signal, the latch portion 181 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the latch portion 181 may be configured to input that workpiece image acquisition signal or a signal derived therefrom as the at least one input signal.

In various implementations, the metrology system 150 may be configured to determine the position and orientation of the light beam source configuration and/or end tool ETL, based on the measurement signals from the light beam sensors S1-S4 of the sensor configuration 160. It will be appreciated that such a system may have certain advantages over various alternative systems. For example, in various implementations a system such as that disclosed herein may be smaller and/or less expensive and/or more accurate than certain alternative systems utilizing alternative technologies (e.g., including certain photogrammetry systems, etc.) as may alternatively be utilized for tracking movement system positions and orientations. The disclosed system also does not take up or obscure any part of the movement volume MV, such as alternative systems that may include a scale or fiducial on the ground or stage, or otherwise in the same area (e.g., in the movement volume MV) where workpieces may otherwise be worked on and/or inspected, etc.

In various implementations, a comparison between a photogrammetry system and the metrology system 150 as disclosed herein may be described as follows. A photogrammetry system may utilize incoherent light sources, for which cameras are utilized to image the light sources, for determining the positions. In some instances, position and angle may be calculated from the source positions. The effective 'lever arm' for determining the angle is the distances between the sources. This is difficult to increase as it necessarily also increases the counteractive lever arm between the source and the lower portion of the end tool (e.g., corresponding to a distance, such as along an end tool axis EA direction, between the source and the contact point CP of the end tool). In other words, photogrammetry configurations which attempt to make it easier to measure the probe angle, also make the end tool position more sensitive to this angle. The camera's field of view in such systems may be the entire working volume, corresponding to a low magnification.

In contrast, in the metrology system 150 as disclosed herein, coherent light sources may typically be utilized. For example, the light sources for the light beam source configuration LC may be coherent light sources (e.g., laser light sources), for which the light beams may be coherent light beams (e.g., laser beams). Diffractive optical elements (e.g., as will be described in more detail below with respect to FIG. 3) may be utilized to produce many diffracted light beams (e.g., which can be dispersed in many directions surrounding the light source configuration LC). In various implementations, a relatively small fraction of the many diffracted or otherwise provided light beams may be directed to or otherwise received by the distributed light beam sensors of the metrology system 150 (e.g., to produce corresponding measurement spots SP on the light beam sensors). In various implementations, the light beam sensors may be various types of cameras and/or two dimensional position sensitive sensors (e.g., lensless cameras, position sensitive detectors, optical position sensors that can measure a position of a light spot in two-dimensions on a sensor surface, etc.) In operation, the large lever arms (e.g., corresponding in part to the distances between the light beam source configuration LC and the light beam sensors S) enable highly accurate orientation (e.g., corresponding to an angle of an end tool, etc.) measurements/determinations. In addition, the effective magnifications for such operations may be relatively high.

In various implementations, measurement signals from the light beam sensors (e.g., corresponding to images and/or indicating two dimensional positions of measurement spots SP formed by the light beams, for which a centroid of each measurement spot may be calculated/determined in terms of XYZ coordinates) may be utilized in combination with the known characteristics of the light beam source configuration LC (e.g., including laser projection based on the known geometric relationships of the light beams including the relative three dimensional angles of each light beam and accounting for any offsets of each light beam at its source, etc.) to calculate/determine the position and orientation (e.g., as based on using nonlinear least squares and/or other processing/calculation techniques). Stated another way, the known vectors of the light beams may be fit to the known locations (e.g., in XYZ coordinates) that they intersect on the light beam sensors (e.g., in terms of the positions of the measurement spots SP) to determine the position and orientation of the light beam source configuration LC. In various implementations, the measurement spots SP on the light beam sensors may each be uniquely identified (e.g., in part by utilizing coarse position information determined from the movement system 110, and/or based on unique or otherwise identifiable characteristics of the light beams, such as unique pattern information of the light beams, such as a pseudo-random pattern with unique or otherwise identifiable portions, etc.)

It will be appreciated that the combination of such features and characteristics of the metrology system 150 may result in higher accuracy position and orientation determinations than those provided by a photogrammetry system such as that described above. As some particular advantages, it is noted that the light beams as utilized in the metrology system 150 have corresponding orientation information that is lacking in photogrammetry and is more sensitive to the orientation (e.g., of the light beam source configuration LC and the end tool ETL). This can increase accuracy by a large amount.

Figure 3:
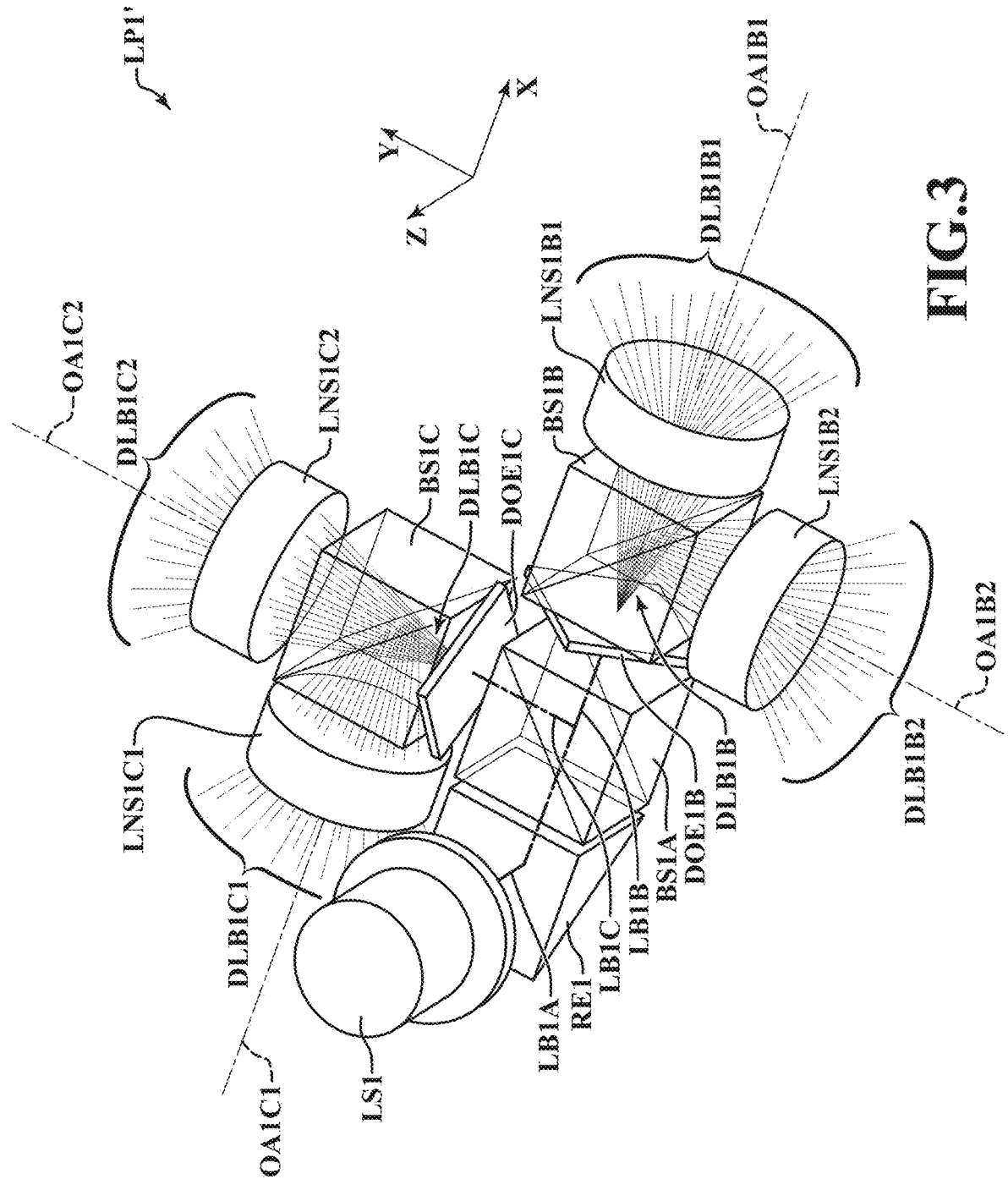
FIG. 3 is a diagram of a first exemplary implementation of a light beam source portion of a light beam source configuration such as may be utilized in the system of FIG. 1.

FIG. 3 is a diagram of a first exemplary implementation of a light beam source portion LP1' of a light beam source configuration LC (e.g., such as may be similar to the light beam source configuration LC utilized in the system of FIG. 1). As illustrated in FIG. 3, the light beam source portion LP1' includes a light source LS1, a reflective element RE1, beamsplitters BS1A, BS1B, BS1C, diffractive optical elements DOE1B, DOE1C, and lenses LNS1B1, LNS1B2, LNS1C1 and LNS1C2. In various implementations, the light source LS1 may be a laser source, for which at least some or all of the light beams in the following description may be laser beams. The light source LS1 produces a light beam LB1A, which is reflected by reflective element RE1 to be directed toward the beamsplitter BS1A, which splits the light beam into light beams LB1B and LB1C, which are directed to the diffractive optical elements DOE1B and DOE1C, respectively.

The light beam LB1B is diffracted by the diffractive optical element DOE1B into diffracted light beams DLB1B, which are split by beamsplitter BS1B into diffracted light beams DLB1B1 and DLB1B2. The diffracted light beams DLB1B1 further diverge after passing through the lens LNS1B1, which has an optical axis OA1B1, and the diffracted light beams DLB1B2 further diverge after passing through the lens LNS1B2, which has an optical axis OA1B2. Similarly, the light beam LB1C is diffracted by the diffractive optical element DOE1C into diffracted light beams DLB1C, which are split by beamsplitter BS1C into diffracted light beams DLB1C1 and DLB1C2. The diffracted light beams DLB1C1 further diverge after passing through the lens LNS1C1 which has an optical axis OAC1, and the diffracted light beams DLB1C2 further diverge after passing through the lens LNS1C2, which has an optical axis OAC2.

Orthogonal X, Y and Z axes are indicated (e.g., as corresponding to a coordinate system for the light beam source portion LP1' and/or light beam source configuration). The optical axes OAB1 and OAC1 are indicated to be parallel to the X-axis, and the optical axes OA1B2 and OAC2 are indicated to be parallel to the Y-axis.

In various implementations, the light beam source portion LP1' may be a first light beam source portion, for which the corresponding light beam source configuration may include additional light beam source portions. For example, the light beam source configuration may include second and third light beam source portions (e.g., in some instances each having identical components as the first light beam source portion LP1'). In such a configuration, for the second light beam source portion, the respective optical axes may be parallel to the X-axis and the Z-axis, and for the third light beam source portion, the respective optical axes may be parallel to the Y-axis and the Z-axis. In such a configuration, there may thus be an approximately equal number of diffracted light beams directed by lenses with optical axes in the X-axis, Y-axis and Z-axis directions. Such a configuration may result in a relatively even distribution of light beams in directions from the light beam source configuration. In one implementation, if such a light beam source configuration were placed at a center of a sphere, there may be an approximately even dispersion around the surface of the sphere of intersection points where the light beams intersect with the surface of the sphere. In various implementations, it may be desirable for a light beam source configuration LC to provide at least a minimum number of light beams as dispersed in the directions surrounding the light beam source configuration LC (e.g., such as at least 10,000 light beams, or at least 100,000 light beams, etc.). In various implementations, a desired minimum number of light beams may depend on the light beam source configuration LC/light beam sensor distance, the number and size of the light beam sensors and the range of possible light beam source configuration LC orientations. In various implementations, it may be desirable for some or all of the light beams to have a similar or an approximately equal angular spacing relative to one another.

In various implementations, each of the light beams (e.g., each of the diffracted light beams DLB in the example of FIG. 3) of a light beam source configuration may have certain known and/or determined characteristics (e.g., relative angular orientations, source points of origin, etc.) which spatially relate each light beam to the light beam source configuration. Such characteristics enable a position and orientation of the light beam source configuration to be determined, based at least in part on the light beams that are directed to and sensed by the light beam sensors of the sensor configuration. With regard to the light beam source portion LP1', it is noted that the diffracted light beams may have certain offsets in relation to one another. For example, the diffracted light beams DLB1B1 may be modeled/regarded/designated as having a source point of origin that is offset along the Y-axis direction from a modeled/regarded/designated source point of origin for the diffracted light beams DLB1C1 (e.g., as related to the offset along the Y-axis direction between the lenses LNS1B1 and LNS1C1). It will be appreciated that such offsets may be included and/or otherwise accounted for in position calculations (e.g., including the processing/calculations as performed by the metrology system position and orientation processing portion 190 for processing the measurement signals from the light beam sensors to determine the position and orientation of the light beam source configuration LC and/or end tool ETL, etc.) Once a position and orientation of the light beam source configuration LC is determined, any known geometric relationships and/or relative positioning/offsets between the light beam source configuration LC and the end tool ETL may also be utilized for determining the position and orientation of the end tool ETL. As will be described in more detail below, FIGS. 5A-5H illustrate certain simplified examples regarding light beams B of a light beam source configuration LC as directed to sensors of a sensor configuration 160, and as corresponding to certain positions and orientations of a light beam source configuration LC.

Figure 4B:
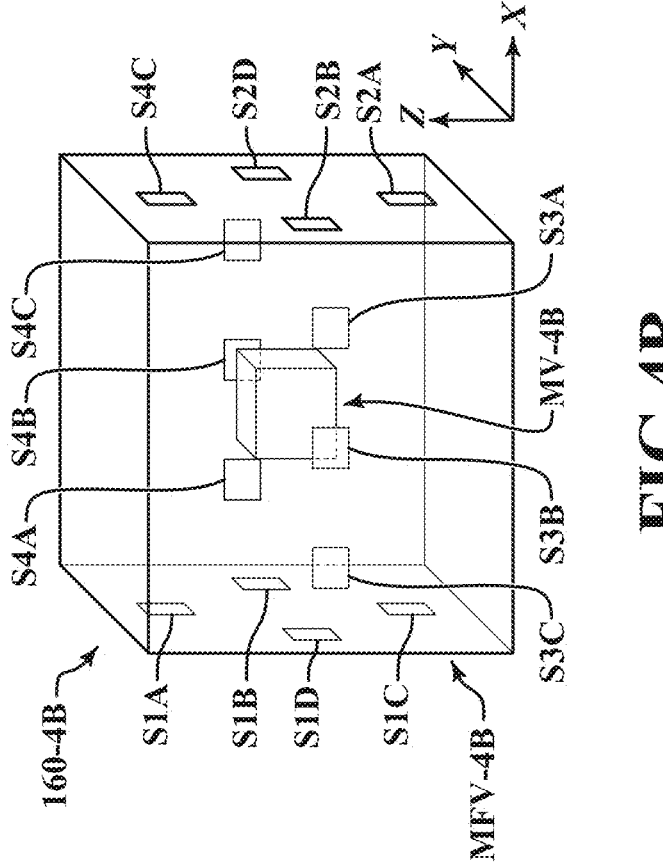
FIGS. 4A and 4B are diagrams of respective movement volumes as surrounded by respective metrology frame volumes which are defined at least in part by respective sensor configurations.
Figure 4A:
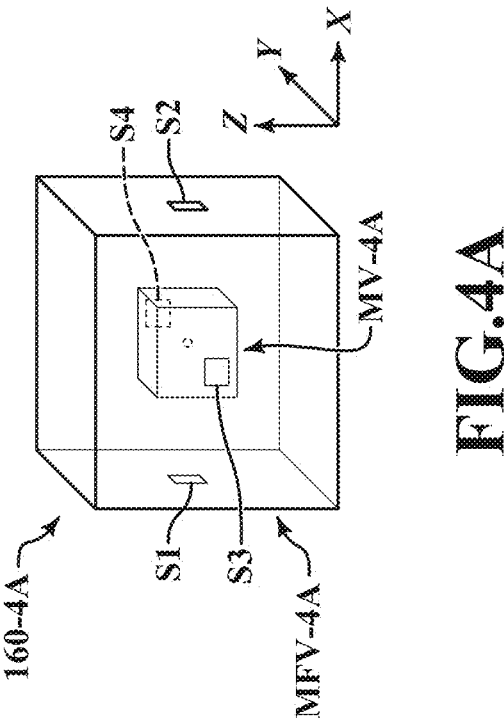

FIGS. 4A and 4B are diagrams of respective movement volumes MV-4A and MV-4B as surrounded by respective metrology frame volumes MFV-4A and MFV-4B which are defined at least in part by respective sensor configurations 160-4A and 160-4B, which each include a respective different number of light beam sensors. In each case, the movement volume MV and metrology frame volume MFV are both represented as cubical volumes with the edges and sides parallel to the orthogonal X, Y, Z axis directions. It will be appreciated that while for simplicity of the illustrations the volumes and other aspects are shown with certain relative dimensions, that in various implementations the relative dimensions of the volumes and other aspects may vary (e.g., the illustrated dimensions may not be to scale, and for which the movement volumes MV may be larger in relation to the metrology frame volumes MFV, etc.)

FIG. 4A illustrates an implementation with a sensor configuration 160-4A including four light beam sensors S1-S4 (e.g., similar to the example implementation illustrated in FIG. 1, and also in relation to the examples of FIGS. 5A-5H, as will be described in more detail below). The four light beam sensors S1-S4 are disposed at positions that are all at a common middle Z-height along a Z-axis direction (i.e., all having a same Z-axis coordinate value). The light beam sensors S1 and S2 are disposed on opposite sides of the metrology frame volume and are parallel to a YZ plane. The light beam sensors S3 and S4 are disposed on opposite sides of the metrology frame volume and are parallel to an XZ plane.

FIG. 4B illustrates an implementation with a sensor configuration 160-4B including fourteen light beam sensors S1A-S1D, S2A-S2D, S3A-S3C and S4A-S4C. In relation to the sensor configuration 160-4A of FIG. 4A, the sensor configuration 160-4B of FIG. 4B may have higher measurement resolution and/or higher measurement accuracy along the X-axis direction (e.g., in accordance with the sets of three light beam sensors S3A-S3C, and S4A-S4C, as disposed at different positions along the X-axis direction on each respective side of the metrology frame volume MFV-4B). In addition, in further comparison to the sensor configuration of FIGS. 4A, the sensor configuration 160-4B of FIG. 4B may have higher measurement resolution and/or higher measurement accuracy along the Y-axis direction (e.g., in accordance with the sets of two light beam sensors S1B and S1D, and S2B and S2D, as disposed at different positions along the Y-axis direction on each respective side of the metrology frame volume MFV-4B, and as compared to the configuration of FIG. 4A with the utilization of the single light beam sensors S1 and S2 on each respective side). Furthermore, also in comparison to the sensor configuration of FIG. 4A, the sensor configuration 160-4B of FIG. 4B may also have higher measurement resolution and/or higher measurement accuracy along the Z-axis direction (e.g., in accordance with the sets of two light beam sensors S1A and S1C, and S2A and S2C, as disposed at different positions along the Z-axis direction on each respective side of the metrology frame volume MFV-4B, and as compared to the configuration of FIG. 4A with the utilization of the single light beam sensors S1 and S2 on each respective side).

FIGS. 5A-5H are diagrams illustrating a light beam source configuration LC' that directs four example light beams B1-B4 toward four light beam sensors S1-S4 of a sensor configuration 160' and which produce four corresponding measurement spots SP1-SP4 for different positions and orientations of the light beam source configuration LC'. In various implementations, the sensor configuration 160' may be similar to that of FIGS. 1 and 4A (e.g., with the four light beam sensors S1-S4 at least partly defining a corresponding cubical metrology frame volume MFV). FIGS. 5A-5H illustrate respective top views 510A-510H, cross-section front views 520A-520H, cross-section side views 530A-530H, and positions of measurements spots views 540A-540H (i.e., in accordance with a front view of the sensor surface of each of the respective light beam sensors S1-S4).

In various implementations, the examples of FIGS. 5A-5H may also be illustrative of operations of sensor configurations with a greater number of light beam sensors, for which the following described examples may be illustrative of the operations of four (e.g., the four most central light beam sensors, etc.) out of the total number of light beam sensors in the given configurations. The examples of FIGS. 5A-5H may also be illustrative of operations of light beam source configurations with a greater number of light beams (e.g., 10's, 100's, or 1000's, etc. of light beams, such as may in some instances be directed in relatively evenly distributed three dimensional directions, such as described above with respect to FIG. 3). In regard to such implementations, the following described examples may be illustrative of the operations of four (e.g., the four most central light beams and/or the four light beams specifically oriented along the X and Y axis directions, etc.) out of the total number of light beams in the given configurations. It will also be appreciated with respect to the examples of FIGS. 5A-5H, that the relative sizes of the light beam sensors S1-S4 appear exaggerated, the relative distances between the light beam sensors appear reduced, and that no offsets are indicated between the source points for the different light beams B1-B4, for purposes of simplifying the illustrated examples.

In the example of FIG. 5A, the light beam source configuration LC', and the corresponding light beams B1-B4, are illustrated as being in a designated "null" position (e.g., including a corresponding "null" orientation). More specifically, the light beams B1 and B2 are each parallel to the X-axis direction, and are each directed to the centers of the light beam sensors S1 and S2, respectively. Similarly, the light beams B3 and B4 are each parallel to the Y-axis direction, and are each directed to the centers of the light beam sensors S3 and S4, respectively. The light beams B1-B4 produce corresponding measurement spots SP1-SP4 in the centers of each of the light beam sensors S1-S4, respectively. In various implementations, the light beam sensors S1-S4 may be various types of cameras and/or two dimensional position sensitive sensors (e.g., optical position sensors that can measure a position of a measurement spot, such as formed by a light beam, in two-dimensions on a sensor surface).

The light beam sensors S1-S4 may output measurement signals that indicate that the measurement spots SP1-SP4 are in the centers of the light beam sensors S1-S4. Given the known geometric relationships between the light beams B1-B4 and the light beam source configuration LC', the measurement signals from the light beam sensors S1-S4 indicate the position and orientation of the light beam source configuration LC' (e.g., as corresponding to the position and orientation of the example of FIG. 5A). The measurement signals may be processed (e.g., by a processing portion 190), for which the processing may determine the position and orientation of the light beam source configuration LC' and/or an end tool ETL to which the light beam source configuration LC' is coupled (e.g., see FIG. 1), etc.

In the example of FIG. 5B (e.g., in comparison to the example of FIG. 5A), the light beam source configuration LC' is illustrated as having been rotated clockwise in an XY plane. The view 510B (i.e., of the XY plane) illustrates the clockwise rotation and indicates the different positions of the light beams B1-B4 on the light beam sensors S1-S4. The view 540B illustrates the positions of the measurement spots SP1-SP4 on the light beam sensors S1-S4, as produced by the light beams B1-B4, respectively. More specifically, the measurement spots SP1-SP4 are shown to each have moved to the middle right of each of the light beam sensors S1-S4, respectively.

In the example of FIG. 5C (e.g., in comparison to the example of FIG. 5A), the light beam source configuration LC' is illustrated as having been rotated clockwise in an XZ plane. The view 520C (i.e., of the XZ plane) illustrates the clockwise rotation and indicates the different positions of the light beams B1 and B2 on the light beam sensors S1 and S2. In the view 540C, the measurement spots SP1 and SP2 are illustrated as having moved to the middle top and middle bottom, respectively, of the light beam sensors S1 and S2, while the measurement spots SP3 and SP4 have remained in the centers of the light beam sensors S3 and S4, respectively.

In the example of FIG. 5D (e.g., in comparison to the example of FIG. 5A), the light beam source configuration LC' is illustrated as having been rotated clockwise in a YZ plane. The view 530D (i.e., of the YZ plane) illustrates the clockwise rotation and indicates the different positions of the light beams B3 and B4 on the light beam sensors S3 and S4. In the view 540D, the measurement spots SP1 and SP2 have remained in the centers of the light beam sensors S1 and S2, respectively, while the measurement spots SP3 and SP4 are illustrated as having moved to the middle top and middle bottom, respectively, of the light beam sensors S3 and S4.

The examples of FIGS. 5B-5D are noted to each correspond at least to a change in orientation of the light beam source configuration LC'. In some implementations, the illustrated changes may not otherwise correspond to a change in position (e.g., depending on where a reference point is designated for the light beam source configuration LC', which changes in position are determined in relation to). In the examples of FIGS. 5A-5H, in various implementations a reference point for a light beam source configuration may be designated as being at a geometric center, or other center, of the light beam source configuration.

In the example of FIG. 5E (e.g., in comparison to the example of FIG. 5A), the light beam source configuration LC' is illustrated as having moved in the XY plane toward the light beam sensor S4. The view 510E (i.e., of the XY plane) illustrates the different positions of the light beams B1 and B2 on the light beam sensors S1 and S2. In the view 540E, the measurement spots SP1 and SP2 are illustrated as having moved to the middle right and middle left, respectively, of the light beam sensors S1 and S2, while the measurement spots SP3 and SP4 have remained in the centers of the light beam sensors S3 and S4, respectively.

In the example of FIG. 5F (e.g., in comparison to the example of FIG. 5A), the light beam source configuration LC' is illustrated as having moved in the XY plane toward the light beam sensor S1. The view 510F (i.e., of the XY plane) illustrates the different positions of the light beams B3 and B4 on the light beam sensors S3 and S4. In the view 540F, the measurement spots SP1 and SP2 have remained in the centers of the light beam sensors S1 and S2, respectively, while the measurement spots SP3 and SP4 are illustrated as having moved to the middle right and middle left, respectively, of the light beam sensors S3 and S4.

In the example of FIG. 5G (e.g., in comparison to the example of FIG. 5A), the light beam source configuration LC' is illustrated as having moved up in the Z direction (i.e., parallel to the Z-axis). The views 520G and 530G (i.e., of the XZ plane and YZ plane, respectively) illustrate the different positions of the light beams B1 and B2 on the light beam sensors S1 and S2, respectively, and of the light beams B3 and B4 on the light beam sensors S3 and S4, respectively. In the view 540G, the measurement spots SP1-SP4 are illustrated as each having moved to the top center of the light beam sensors S1-S4, respectively.

In the example of FIG. 5H (e.g., in comparison to the example of FIG. 5A), the light beam source configuration LC' is illustrated as having been rotated clockwise in the XY plane and moved up in the Z direction (i.e., parallel to the Z-axis). The view 510H (i.e., of the XY plane) illustrates the clockwise rotation and the different positions of the light beams B1-B4 on the light beam sensors S1-S4. The views 520H and 530H (i.e., of the XZ plane and YZ plane, respectively) illustrate the different positions of the light beams B1 and B2 on the light beam sensors S1 and S2, respectively, and of the light beams B3 and B4 on the light beam sensors S3 and S4, respectively. In the view 540H, the measurement spots SP1-SP4 are illustrated as each having moved to the top right corner the light beam sensors S1-S4, respectively.

As described above, the light beam sensors S1-S4 may output measurement signals that indicate the positions of each of the measurement spots SP1-SP4 on the respective light beam sensors S1-S4. Given the known geometric relationships between the light beams B1-B4 and the light beam source configuration LC' (e.g., including the known angular orientations of the light beams B1-B4 as directed by and in relation to the light beam source configuration LC' and in relation to each other), the positions of the measurement spots SP1-SP4 on the light beam sensors S1-S4 indicate the position and orientation of the light beam source configuration LC' (e.g., as corresponding to the orientations in the examples of FIGS. 5A-5H). The measurement signals from the light beam sensors S1-S4 may be processed (e.g., by a processing portion 190), for which the processing may determine (e.g., at least in part utilizing the known geometric relationships, etc.) the position and orientation of the light beam source configuration LC' and/or an end tool ETL to which the light beam source configuration LC' is coupled (e.g., see FIG. 1), etc.

With respect to the measurement signals from the light beam sensors S1-S4 indicating the position and orientation of the light beam source configuration LC', it will be appreciated that the simplified examples of FIGS. 5A-5H are all with respect to the light beams B1-B4 each being directed to the respective light beam sensor S1-S4. More specifically, in each example, the light beam B1 is directed to the light beam sensor S1, the light beam B2 is directed to the light beam sensor S2, the light beam B3 is directed to the light beam sensor S3 and the light beam B4 is directed to the light beam sensor S4. In these examples, it will be appreciated that if the light beam source configuration LC' were rotated in the XY plane by 90 degrees, 180 degrees or 270 degrees, that similar measurement spots may be produced in similar locations on the light beam sensors S1-S4, for which it may be desirable to be able to disambiguate relative to (e.g., distinguish between) such possibilities.

For example, with respect to the orientation illustrated in FIG. 5A, and with the light beams B1-B4 each being directed to the respective light beam sensor S1-S4, it will be appreciated that the measurement signals indicating the that measurement spots SP1-SP4 are each in the centers of the respective light beam sensors S1-S4, respectively, uniquely indicate that the light beam source configuration LC' is in the position and orientation illustrated in the views 510A-530A of FIG. 5A (e.g., corresponding to a "null position" in the given example). However, with respect to the top view 510A, if the configuration were rotated clockwise by 90 degrees in the XY plane, measurement spots SP would similarly be produced in the centers of the light beam sensors S1-S4. More specifically, the light beam B1 would produce a measurement spot SP1 at the center of the light beam sensor S4, the light beam B2 would produce a measurement spot SP2 at the center of the light beam sensor S3, the light beam B3 would produce a measurement spot SP3 at the center of the light beam sensor S1, and the light beam B4 would produce a measurement spot SP4 at the center of the light beam sensor S2. It will be appreciated that similar measurement spots at the centers of the light beam sensors S1-S4 as produced by different respective measurement beams may occur for similar clockwise rotations of the configuration in the XY plane of 180 degrees and 270 degrees, with respect to the initial orientation as illustrated in the top view 510A.

In order to disambiguate between the sets of measurement signals that would result from such orientations (e.g., which might otherwise appear relatively identical), it may be desirable for the system to be configured to determine (e.g., at least approximately) which light beams are generally directed toward which light beam sensors. As one approach for addressing such issues, position information from the movement system 110 may be utilized for the disambiguation. For example, in relation to the measurement system 110 as described above with respect to FIGS. 1 and 2, the position information determined from the positions sensors SEN1-SEN5 (e.g., as received by the movement system position and orientation processing portion 147), may be utilized to determine a coarse position and orientation of the end tool ETL and/or of the light beam source configuration LC (e.g., with a movement system accuracy). While the movement system accuracy may be lower than that desired for certain applications, it may be useful for the disambiguation (e.g., such as described in relation to the above examples). More specifically, the movement system accuracy may be able to provide coarse position information (e.g., indicating the coarse position and orientation of the end tool ETL and/or of the light beam source configuration LC), which may be utilized to determine which light beams are generally directed toward which light beam sensors.

Returning to the above examples, in an instance with the configuration of FIG. 5A where the measurement signals from the light beam sensors S1-S4 indicate that the measurement spots are all in the centers of the light beam sensors, the position and orientation information from the movement system may be utilized to disambiguate the possibilities for the orientation of the light beam source configuration LC' (e.g., between being a 0 degree rotation as illustrated in FIG. 5A, or a 90 degree rotation, or a 180 degree rotation, or a 270 degree rotation). For example, the position and orientation information from the movement system 110 may be utilized to determine whether the measurement spot that is at the center of the light beam sensor S1 is produced by the light beam B1, B2, B3 or B4. As noted above, while the measurement system accuracy may be relatively low, it may effectively be utilized by the metrology system for disambiguating possibilities such as those described above (in accordance with the coarse position information provided by the movement system), and for which the metrology system may then effectively provide higher accuracy measurements in accordance with the processes such as those described herein.

In various implementations, a general characterization of the relationship between the measurement signals of the movement system 110 and the measurement signals of the metrology system 150 may be described as follows. The position and orientation information (e.g., including measurements) determined from one or more of the position sensors SEN1-SEN5 of the movement system 110 (i.e., with the movement system accuracy) may be characterized as providing relatively coarse scale information (e.g., including coarse scale measurements of position and orientation, etc.) The position and orientation information (e.g., including measurements) determined from the metrology system 150 (e.g., as based on measurement signals from the light beam sensors) may be characterized as providing relatively fine scale information (e.g., including fine scale measurements of position and orientation, etc.) In various implementations, the measurements of the two systems may be combined to provide high accuracy measurements over a relatively large non-ambiguity range (e.g., such as micron level accuracy over a cubed meter movement volume).

As some specific example values, in one example implementation the movement system may have a positioning accuracy/potential position error of approximately 100 microns (e.g., with a non-ambiguity range provided over a 1 meter cubed movement/measurement volume as a coarse scale range). In this example, the metrology system may be configured to be able to resolve a potential distance error of the coarse scale measurement, such as with a non-ambiguity range that is larger than the potential distance error (e.g., a non-ambiguity range larger than 100 microns in this example, and with micron level accuracy, as a fine scale range). In accordance with such example values, the measurements (e.g., position and orientation information) of the two systems may be combined, to provide high accuracy measurements (e.g., with the micron level accuracy over the 1 meter cubed movement volume).

In regard to a metrology system such as that disclosed herein, such principles may also be generally described in terms of identifying/disambiguating which light beams of a light beam source configuration are directed to which light beam sensors (e.g., for a given measurement spot on a light beam sensor). In relation to the above example values, the positioning accuracy/potential position error of approximately 100 microns of the movement system (e.g., with a non-ambiguity range provided over a 1 meter cubed movement/measurement volume as a coarse scale range), may be sufficient for identifying/determining/disambiguating which light beams are directed to which light beam sensors. The non-ambiguity range of the metrology system (e.g., which is larger than 100 microns in the above example, and with micron level accuracy, as a fine scale range), may correspond to a range over which different positions and orientations of the light beam source configuration can be unambiguously determined (e.g., in accordance with measurement spots moving across or otherwise being in different respective positions on the light beam sensors, such as illustrated in part by the simplified examples of FIGS. 5A-5H).

As an alternative and/or in addition to the above noted implementations (e.g., in which position information from a movement system is utilized for disambiguation), the light beams may also or alternatively have certain characteristics which may be utilized for disambiguation (e.g., which enable determinations of which light beams are directed toward which light beam sensors). For example, the light beams may be arranged in a pattern (e.g., with unique portions). In various implementations, the light beams may also or alternatively have different wavelengths (e.g., colors), timings, modulation, structures, and/or other characteristics that may be sensed/identified and utilized to determine which light beams are directed to which light beam sensors (e.g., for which the light beam sensors may also have certain corresponding differentiation capabilities, such as including different color detectors, etc.) In various implementations, one or more of the characteristics (e.g., timing, modulation, etc.) of the light beams may be controlled by a light beam source configuration control portion 192 (e.g., see FIG. 2), which may provide associated signals (e.g., timing signals, etc.) to a sensor configuration control and processing portion 180 and/or a metrology system position and orientation processing portion 190 (e.g., to be utilized as part of the processing for receiving measurement signals from the light beam sensors and utilizing the measurement signals for determining which light beams are directed toward which light beam sensors).

Figures 6A, 6B, 6C:
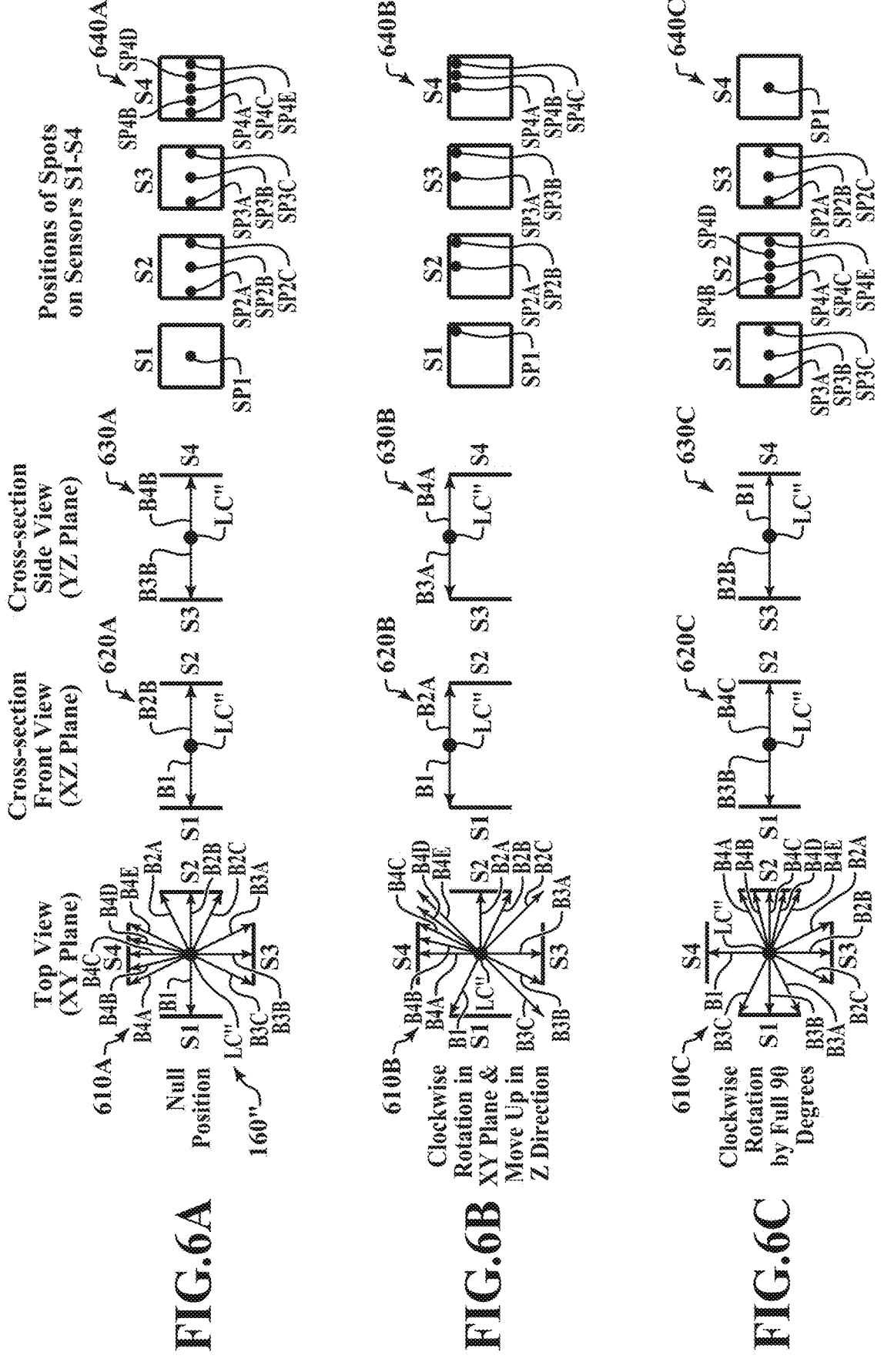
FIGS. 6A-6C are diagrams illustrating twelve example light beams of a light beam source configuration and corresponding measurement spots on four sensors of a sensor configuration for different positions and orientations of the light beam source configuration.

FIGS. 6A-6C are diagrams illustrating twelve example light beams B of a light beam source configuration LC" and corresponding measurement spots SP on four sensors S1-S4 of a sensor configuration 160" for different positions and orientations of the light beam source configuration LC".

More specifically, in various implementations the light beam source configuration LC" provides and directs light beams B1, B2A-B2C, B3A-B3C and B4A-B4E to form corresponding measurement spots SP1, SP2A-SP2C, SP3A-SP3C and SP4A-SP4E on the light beam sensors S1-S4. It will be appreciated that in the examples of FIGS. 6A-6C, the light beams are arranged in a pattern (e.g., which in the orientation of FIG. 6A results in the single light beam B1 directed toward the light beam sensor S1, the three light beams B2A-B2C directed toward the light beam sensor S2, the three light beams B3A-B3C directed toward the light beam sensor S3, and the five light beams B4A-B4E directed toward the light beam sensor S4). It is noted that such patterns may include different spacings and orientations (e.g., angular spacings and orientations) between the light beams and/or other characteristics that may enable a portion of the pattern as directed to a light beam sensor or group of light beam sensors to be uniquely identified (e.g., for use in determining/disambiguating the orientation and/or position of the light beam sensor configuration, etc.)

In the example of FIG. 6A (with certain similarities to the orientation illustrated in FIG. 5A), the light beam source configuration LC", and the corresponding light beams B1, B2A-B2C, B3A-B3C and B4A-B4E, are illustrated as being in a designated "null" position (e.g., including a corresponding "null" orientation). More specifically, the light beam B1 and the central light beam B2B are each parallel to the X-axis direction, and are each directed to the centers of the light beam sensors S1 and S2, respectively. Similarly, the central light beams B3B and B4C are each parallel to the Y-axis direction, and are each directed to the centers of the light beam sensors S3 and S4, respectively.

In the orientation illustrated in FIG. 6A, the light beams B1, B2A-B2C, B3A-B3C and B4A-B4E produce corresponding measurement spots SP1, SP2A-SP2C, SP3A-SP3C and SP4A-SP4E on the light beam sensors S1-S4, respectively. As illustrated in the view 640A, the measurement spots SP1, SP2B, SP3B and SP4C are all in the centers of the light beam sensors S1, S2, S3 and S4, respectively. These measurement spot positions are noted to be similar to the measurement spot positions illustrated in FIG. 5A. However, unlike FIG. 5A where only single measurement spots are produced on each light beam sensor, in FIG. 6A, different numbers and/or arrangements of measurement spots are formed on different light beam sensors, in accordance with the pattern of light beams that are provided and directed by the light beam source configuration LC".

For example, while the light beam B1 produces only the single measurement spot SP1 at the center of the light beam sensor S1, the light beams B2A-B2C and B3A-B3C each produce a row of three measurement spots SP2A-SP2C and SP3A-SP3C across the middles of the light beam sensors S2 and S3, respectively. In addition, the light beams B4A-B4E produce a row of five measurement spots SP4A-SP4E across the middle of the light beam sensor S4. It will be appreciated that such characteristics may enable a determination of which light beams are directed to which light beam sensors (e.g., for enabling disambiguation in regard to the issues such as those described above), and for which additional position information (e.g., from a movement system) may not be required (e.g., although in some implementations may also be utilized in addition to such patterns or other information).

The light beam sensors S1-S4 may output measurement signals that indicate that the measurement spots SP1, SP2A-SP2C, SP3A-SP3C and SP4A-SP4E are in the indicated positions on the light beam sensors S1-S4. Given the known geometric relationships between the light beams B1, B2A-B2C, B3A-B3C and B4A-B4E and the light beam source configuration LC", the measurement signals from the light beam sensors S1-S4 indicate the position and orientation of the light beam source configuration LC". The measurement signals may be processed (e.g., by a processing portion 190), for which the processing may determine the position and orientation of the light beam source configuration LC" and/or an end tool ETL to which the light beam source configuration LC" is coupled (e.g., see FIG. 1), etc.

In the example of FIG. 6B (e.g., in comparison to the example of FIG. 6A), the light beam source configuration LC" is illustrated as having been rotated clockwise in the XY plane and moved up in the Z direction (i.e., parallel to the Z-axis, with certain similarities to the example of FIG. 5H). The view 610B (i.e., of the XY plane) illustrates the clockwise rotation and the top view of the different positions of the light beams B1, B2A-B2B, B3A-B3B and B4A-B4C on the light beam sensors S1-S4. It is noted that the light beams B2C, B3C and B4D-B4E are no longer directed to the respective light beam sensors, and are instead directed to spacings between the light beam sensors of the sensor configuration (e.g., such as may typically occur for some, or many, light beams in a relatively evenly distributed light beam pattern as directed towards a relatively limited number of light beam sensors which may have limited sizes and be at relatively large distances from the light beam source configuration, etc.). The cross section views 620B and 630B (i.e., at the cross sectional XZ plane and YZ plane, respectively) illustrate the different positions of the light beams B1 and B2A on the light beam sensors S1 and S2, respectively, and of the light beams B3A and B4A on the light beam sensors S3 and S4, respectively.

In the view 640B, the measurement spots SP1, SP2A-SP2B, SP3A-SP3B and SP4A-SP4C are illustrated as each having moved to the top and shifted to the right on the light beam sensors S1-S4, respectively. It is also noted that in the view 640B, there are no longer measurement spots SP2C, SP3C and SP4D-SP4E formed on the light beam sensors S2-S4 (i.e., due to the corresponding light beams B2C, B3C and B4D-B4E being directed to spaces between the light beam sensors). This example indicates in part why it may be desirable to have a sufficient number and/or relatively even distribution of light beams emanating in directions from a light beam source configuration. More specifically, given the sizes and possible distances of the light beam sensors from the light beam source configuration (e.g., during measurement operations) for a given implementation, it may generally be desirable for the light beam source configuration to provide a sufficient number and density of light beams in directions surrounding the light beam source configuration. Such factors for the light beam source configuration may help ensure that at least some, or all, of the light beam sensors of the sensor configuration have at least some light beams directed to them (e.g., for all possible orientations of the light beam source configuration during measurement operations) for producing corresponding measurement spots and corresponding measurement signals.

In the example of FIG. 6C (e.g., in comparison to the example of FIG. 6A), the light beam source configuration LC" is illustrated as having been rotated clockwise in the XY plane by a full 90 degrees. The view 610C (i.e., of the XY plane) illustrates the clockwise 90 degree rotation and the top view of the different positions of the light beams B1, B2A-B2C, B3A-B3C and B4A-B4E. Due to the 90 degree rotation, the light beam B1 is illustrated as being directed to the light beam sensor S4 (e.g., rather than the light beam sensor S1 as in the orientation of FIG. 5A). The light beams B2A-B2C are illustrated as being directed to the light beam sensor S3 (e.g., rather than the light beam sensor S2 as in the orientation of FIG. 5A). The light beams B3A-B3C are illustrated as being directed to the light beam sensor S1 (e.g., rather than the light beam sensor S3 as in the orientation of FIG. 5A). The light beams B4A-B4E are illustrated as being directed to the light beam sensor S2 (e.g., rather than the light beam sensor S4 as in the orientation of FIG. 5A). The light beam B1 and the central light beam B2B are each parallel to the Y-axis direction, and are each directed to the centers of the light beam sensors S4 and S3, respectively. Similarly, the central light beams B3B and B4C are each parallel to the X-axis direction, and are each directed to the centers of the light beam sensors S1 and S2, respectively.

In the orientation illustrated in FIG. 6C, the light beams B1, B2A-B2C, B3A-B3C and B4A-B4E produce corresponding measurement spots SP1, SP2A-SP2C, SP3A-SP3C and SP4A-SP4E on the light beam sensors S4, S3, S1 and S2, respectively. As illustrated in the view 640C, the measurement spots SP1, SP2B, SP3B and SP4C are all in the centers of the light beam sensors S4, S3, S1 and S2, respectively. As noted above, unlike FIGS. 5A-5H where only single measurement spots are produced on each light beam sensor, in FIG. 6C, different numbers of measurement spots are formed on different light beam sensors, in accordance with the pattern of light beams that are provided and directed by the light beam source configuration LC".

For example, while the light beam B1 produces only the single measurement spot SP1 at the center of the light beam sensor S4, the light beams B2A-B2C and B3A-B3C each produce a row of three measurement spots SP2A-SP2C and SP3A-SP3C across the middles of the light beam sensors S3 and S1, respectively. In addition, the light beams B4A-B4E produce a row of five measurement spots SP4A-SP4E across the middle of the light beam sensor S2. It will be appreciated that such characteristics may enable a determination of which light beams are directed to which light beam sensors (e.g., for enabling disambiguation in regard to the issues such as those described above).

Figures 7A, 7B, 8A, 8B:
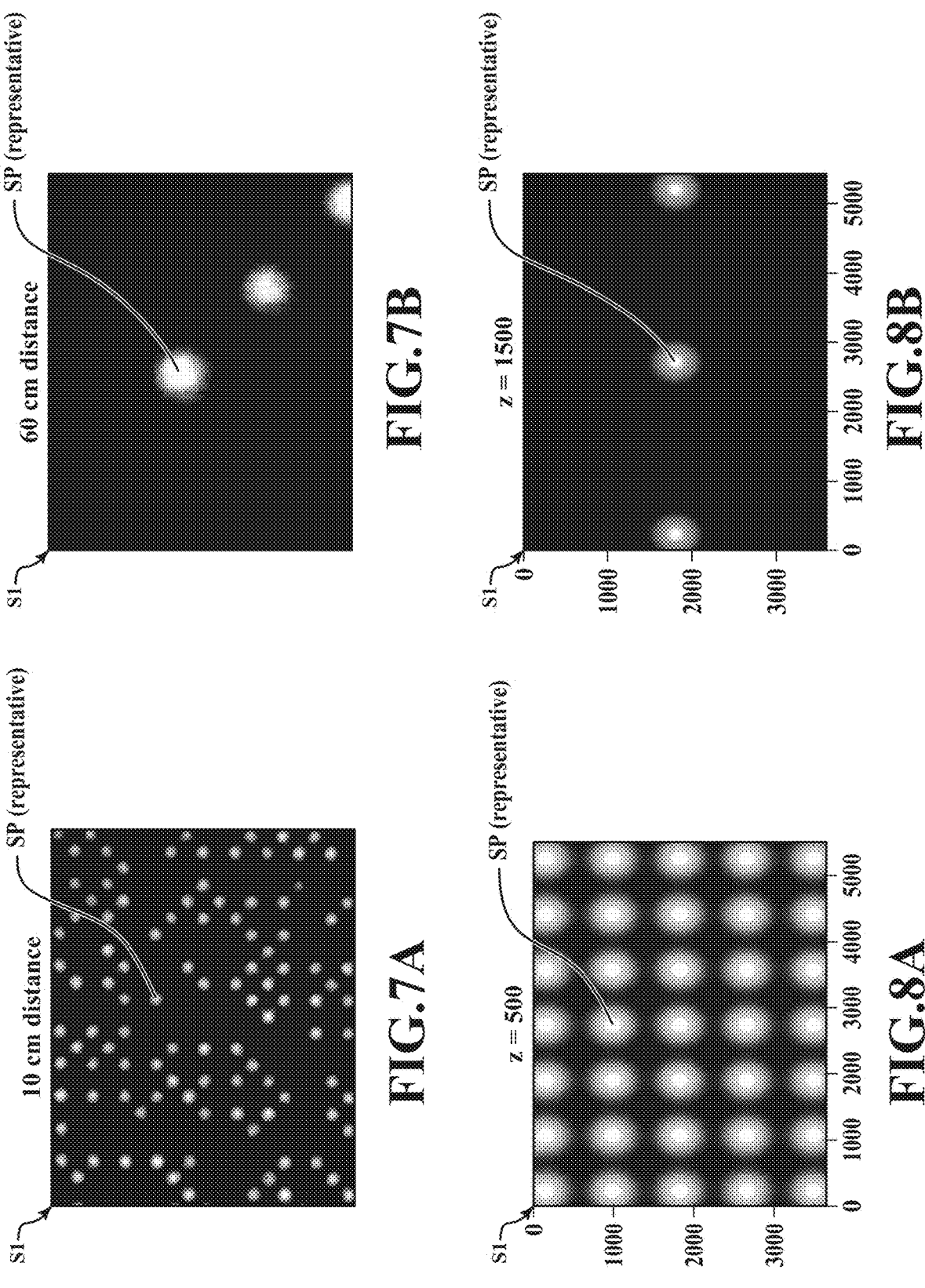
FIGS. 7A and 7B are diagrams illustrating a first arrangement of measurement spots as formed on a sensor with a light beam source configuration at first and second distances from the sensor, respectively.
FIGS. 8A and 8B are diagrams illustrating a second arrangement of measurement spots as formed on a sensor with a light beam source configuration at first and second distance from the sensor, respectively.

For example, the measurement signal from the light beam sensor S4 indicates the position of the single measurement spot SP1 at the center of the light beam sensor S4, as uniquely corresponding to the light beam B1 (e.g., as compared to the orientation of FIG. 6A where the measurement signal from the light beam sensor S1 uniquely indicated the light beam B1 as directed to the light beam sensor S1). The measurement signal(s) from the light beam sensor S4 indicates the positions of the measurement spots SP4A-SP4E in the row at the middle of the light beam sensor S4, as uniquely corresponding to the light beams B4A-B4E (e.g., as compared to the orientation of FIG. 6A where the measurement signal(s) from the light beam sensor S4 uniquely indicated the light beams B4A-B4E as directed to the light beam sensor S4). In accordance with the pattern of light beams from the light beam source configuration LC" having unique or otherwise differentiated pattern portions, corresponding unique pattern portion measurement spots may be formed on the respective light beam sensors that the pattern portions are directed to. Such configurations may enable the measurement signals from the light beam sensors to be utilized to determine which light beams are directed to which light beam sensors (e.g., for disambiguation and/or otherwise determining a position and orientation of the light beam source configuration LC" in relation to the light beam sensors S1-S4, etc.) FIGS. 7A and 7B are diagrams illustrating a first arrangement of measurement spots SP as formed by light beams from a light beam source configuration at first and second distances from a light beam sensor S1, respectively. In the example of FIG. 7A, the light beam source configuration is at the first distance, which is a relatively short distance (e.g., 10 cm) from the light beam sensor S1. The light beam source configuration emits a pattern of light beams with an angular spacing/angular dispersion such that, at the relatively short distance of FIG. 7A, many measurement spots SP are produced on the light beam sensor S1. In contrast, in the example of FIG. 7B, the light beam source configuration is at the second distance, which is a relatively longer distance (e.g., 60 cm) from the light beam sensor S1. As a result of the longer distance and the angular spacing/angular dispersion of the light beams, fewer measurement spots are produced on the light beam sensor S1. In addition, each of the corresponding measurement spots SP in FIG. 7B are larger than in FIG. 7A (e.g., given the additional divergence of the light beams over the longer distance to the sensor S1 in FIG. 7B).

FIGS. 8A and 8B are diagrams illustrating a second arrangement of measurement spots SP as formed by light beams from a light beam source configuration at first and second distances from a light beam sensor S1, respectively. FIGS. 8A and 8B show examples similar to those of FIGS. 7A and 7B, except for which the light beams and the corresponding pattern are more structured. For example, the light beams are arranged such that measurement spots are produced in evenly spaced rows and columns, with the light beams being more collimated or otherwise structured so as to produce measurement spots with larger sizes at shorter distances and with less variance in size at different distances. In some implementations, for some optical sources and a large range of possible distances between the light source configuration and the light beam sensors, it may generally be desirable to have more collimated beams such as those of the example of FIGS. 8A and 8B. As illustrated in FIG. 8A, the measurement spots SP are illustrated as being produced on the light beam sensor S1 in the relatively evenly spaced rows and columns and with larger areas that are relatively similar to those of FIG. 8B.

In the example of FIG. 8A, the light beam source configuration is at a first distance from the light beam sensor S1, which may be a relatively shorter distance (e.g., 500 mm). The light beam source configuration emits the pattern of light beams with an angular spacing/angular dispersion such that, at the relatively short distance of FIG. 8A, many measurement spots are produced on the light beam sensor S1. In the example of FIG. 8B, the light beam source configuration is at a second distance from the light beam sensor S1, which may be a relatively longer distance (e.g., 1500 mm). As a result of the longer distance of FIG. 8B and the angular spacing/angular dispersion of the light beams, fewer measurement spots are produced on the light beam sensor S1. In the examples of FIGS. 8A and 8B, the light beam sensor S1 comprises an array of pixels (e.g., an array of 3600 pixels×5400 pixels).

As a general requirement for the operation of the metrology system 100, it is desirable (e.g., for at least some of the light beam sensors) to have at least one measurement spot produced on each light beam sensor. In addition, it is also desirable to not have too many measurement spots produced on each light beam sensor (e.g., for which the measurement spots may overlap or otherwise cause issues for reducing the accuracy of the measured spot position or making it difficult for the system to distinguish which light beams the measurement spots are produced by, etc.). FIG. 8A in particular is an example that in certain implementations may be characterized as having more than a desired number of measurement spots on the light beam sensor S1 (e.g., for which it can be seen how measurement spots may begin to overlap for such a high density of measurement spots).

With respect to FIGS. 7B and 8B, it will be appreciated that the further distance of the light beam source configuration from the sensor S1 results in a significantly lower density of measurement spots on the light beam sensor S1, and with a corresponding greater spacing between the measurement spots. In relation to the lower density and greater spacing between the measurement spots in FIGS. 7B and 8B, it will be appreciated that if the light beam source configuration is moved even further from the sensor S1, the spacings between the measurement spots that would be produced at such a distance may become so large that the sensor S1 may fit within these spacings, such that for certain positions and orientations of the light beam source configuration, no measurement spots may be produced on the light beam sensor S1.

As will be described in more detail below, it may generally be desirable for the light beam source configuration to produce a relatively low density of measurement spots at short working distances (i.e., when the light beam source configuration is relatively close to the light beam sensors, so as to not to produce too many measurement spots on the light beam sensors), and to produce a relatively high density of measurement spots at long working distances (i.e., when the light beam source configuration is relatively far from the light beam sensors, so that at least one or more measurement spots will be produced on each light beam sensor). As will be described in more detail below, in accordance with principles as described herein, such issues may be addressed by a configuration in which the light beam source configuration provides both a first pattern of light beams that has a lower density of light beams, and a second pattern of light beams that has a higher density of light beams.

Figure 9A:
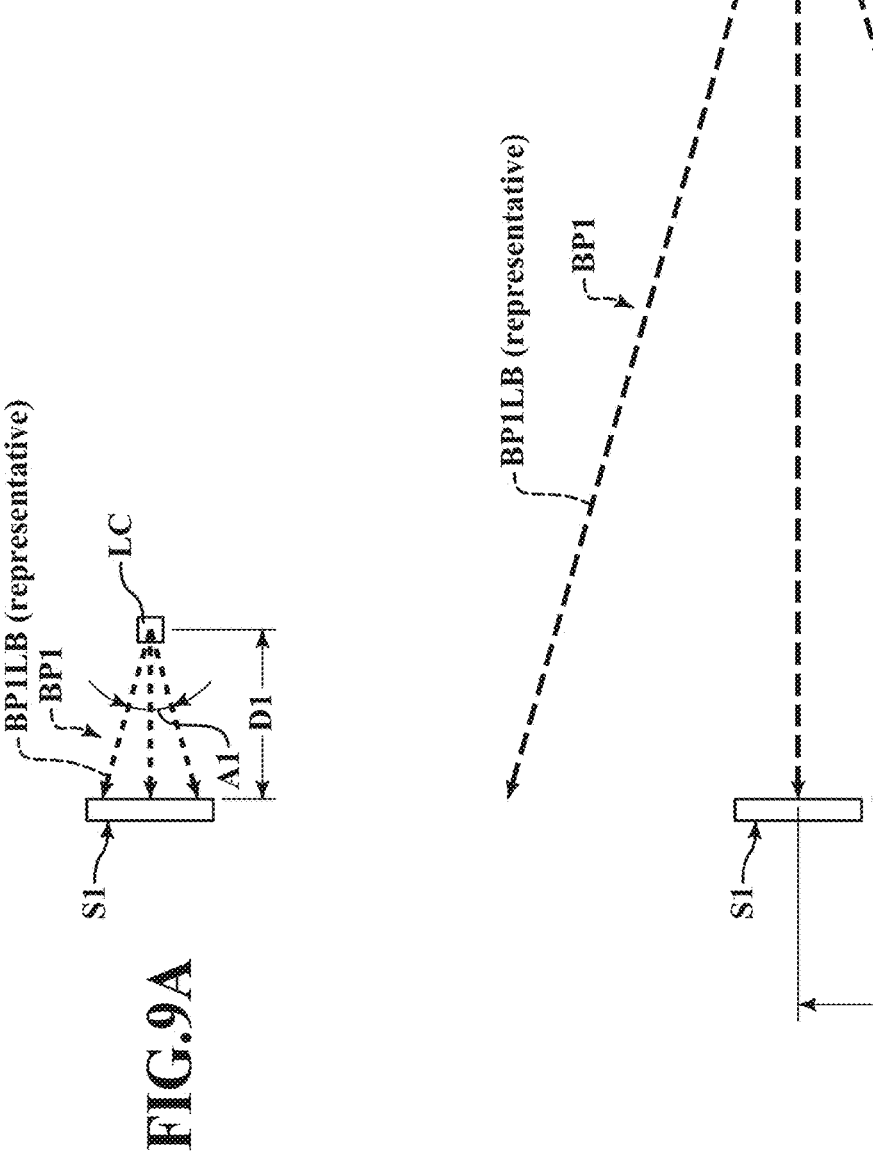
FIGS. 9A and 9B are diagrams illustrating a light beam source configuration at a first distance and a second distance, respectively, from a light beam sensor, and providing a first pattern of light beams.
Figure 9B:
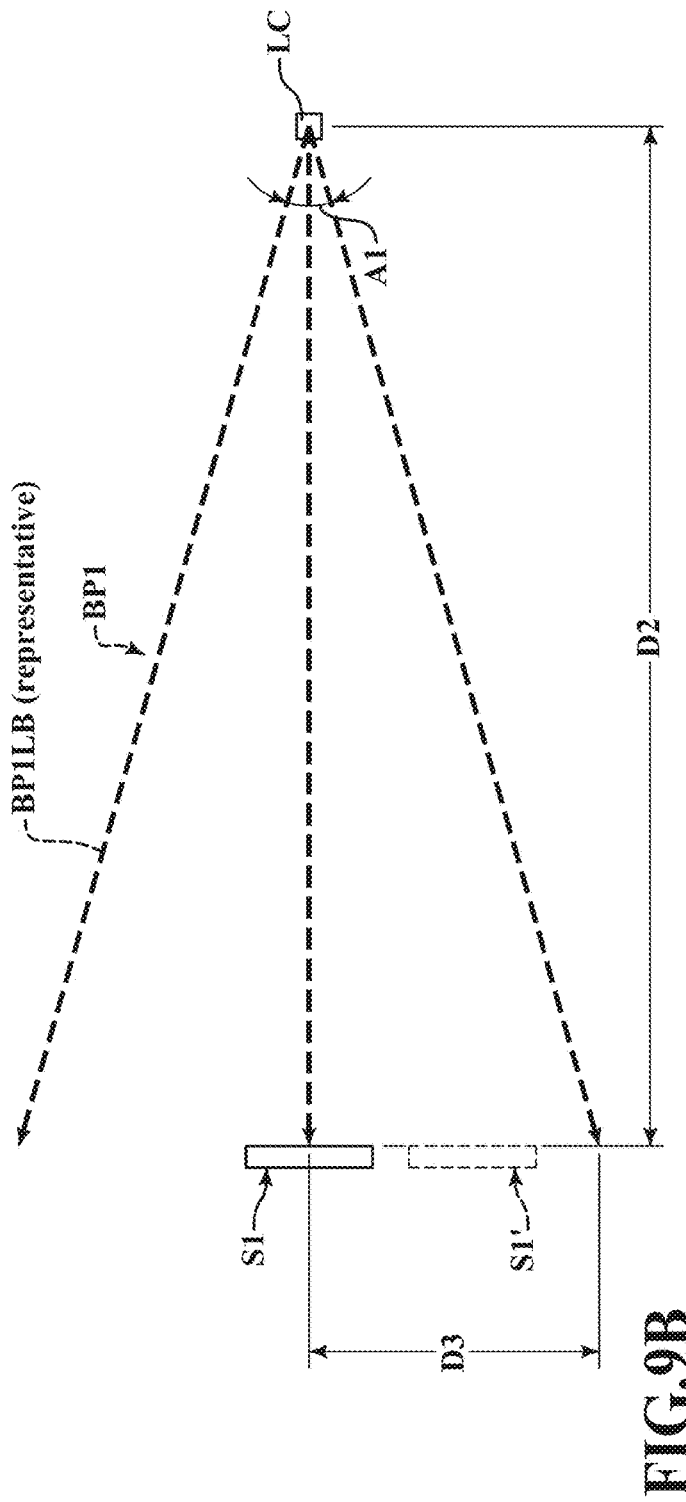

FIGS. 9A and 9B are diagrams illustrating a light beam source configuration LC at a first distance D1 and a second distance D2, respectively, from a light beam sensor S1, and providing a first pattern of light beams BP1. As illustrated in FIGS. 9A and 9B, the light beam source configuration LC provides the first pattern of light beams BP1 that has a relatively low density of first pattern light beams BP1LB. As a result, as illustrated in FIG. 9A, when the light beam source configuration LC is at a distance D1 (e.g., a relatively short distance) from the light beam sensor S1, a relatively low density of measurement spots are produced.

In the simplified examples of FIGS. 9A and 9B, the density of first pattern light beams BP1LB may be referenced in terms of the number of light beams included within a particular angular range, such as in reference to an angle A1. In one specific numerical example, the angle A1 may be referenced as being approximately 30 degrees, and for which in the two-dimensional perspective of FIGS. 9A and 9B, the first pattern light beams BP1LB are illustrated as having an angular spacing of approximately 15 degrees, such that three first pattern light beams BP1LB are illustrated for the 30 degree range of angle A1. In the example of FIG. 9A, it is indicated that the three illustrated first pattern light beams BP1LB produce three corresponding measurement spots on the light beam sensor S1.

In the example of FIG. 9B, the light beam source configuration LC is indicated as being at the distance D2 (e.g., a relatively longer distance) from the light beam sensor S1. Given the angular spacing/angular density of the first pattern light beams BP1LB, it can be seen that at the longer distance D2, only one first pattern light beam BP1LB is directed towards and produces a corresponding measurement spot on the light beam sensor S1. It is also indicated that at the distance D2, the linear spacings between the first pattern light beams BP1LB is a distance D3. As illustrated, the distance D3 is larger than a corresponding dimension of the light beam sensor S1, such that the light beam sensor S1 may fit between the first pattern light beams BP1LB (i.e., which at the distance D2 are separated by the spacings D3). As an example, a light beam sensor S1' is indicated in a position that falls in between the first pattern light beams BP1LB (i.e., at the distance D2), such that no first pattern light beams BP1LB are directed toward the light beam sensor S1' and correspondingly no measurement spot is produced on the light beam sensor S1'.

As noted above, in various implementations, in order for the metrology system to make accurate determinations of the position and orientation of the light beam source configuration LC, at least some light beam sensors of the sensor configuration must receive light beams and correspondingly have measurement spots produced. In this regard, it may generally be undesirable for the pattern of light beams to have an angular spacing/angular dispersion such that for certain positions and orientations, an undesired number of light beam sensors may not have measurement spots produced. In relation to such considerations, it is noted that the first pattern of light beams BP1 produces a desirable number of measurement spots on the light beam sensor S1 at the distance D1, such as illustrated in FIG. 9A, but as illustrated in FIG. 9B, at the distance D2 has an angular spacing/angular dispersion such that less than a desired number of measurement spots may be produced on a corresponding light beam sensor (e.g., such as forming no measurement spots on the light beam sensor S1').

Figure 10A:
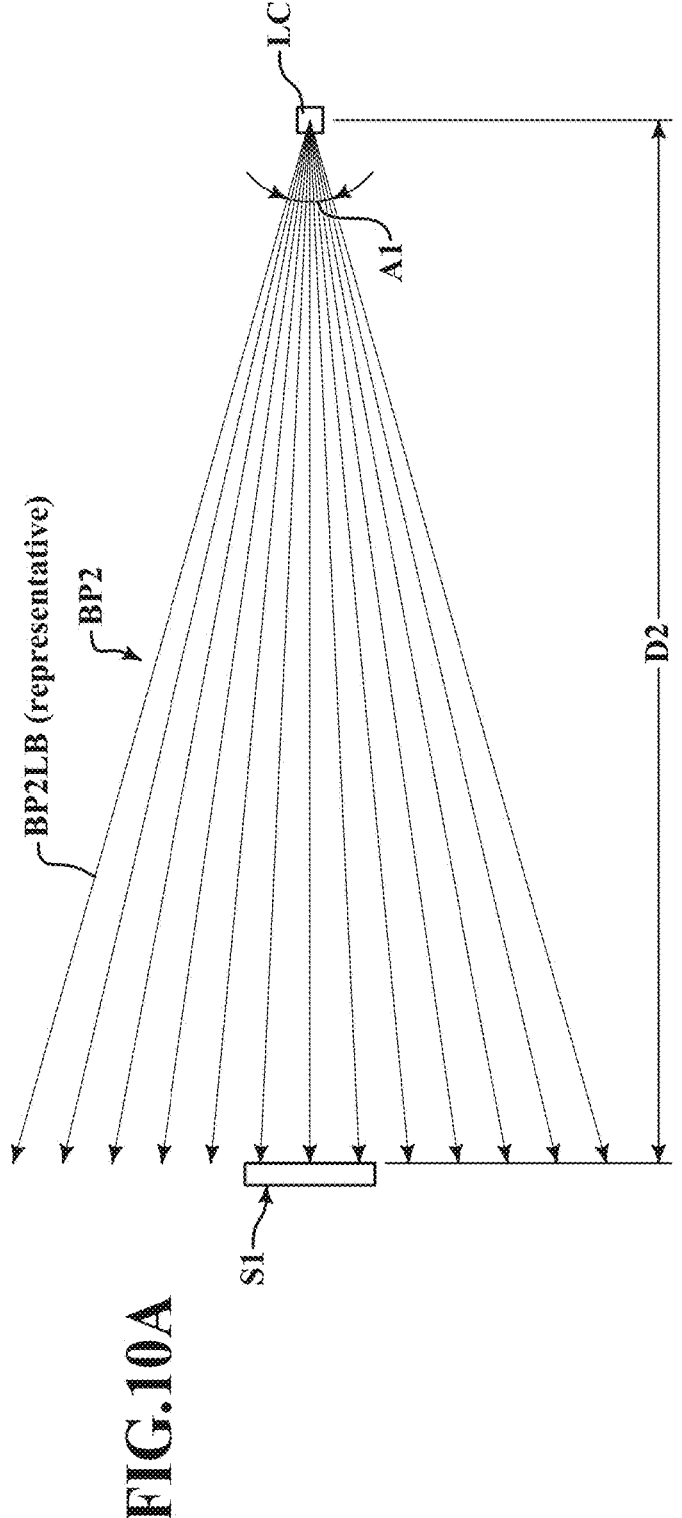
FIGS. 10A and 10B are diagrams illustrating a light beam source configuration at a first distance and a second distance, respectively, from a light beam sensor, and providing a second pattern of light beams.
Figure 10B:
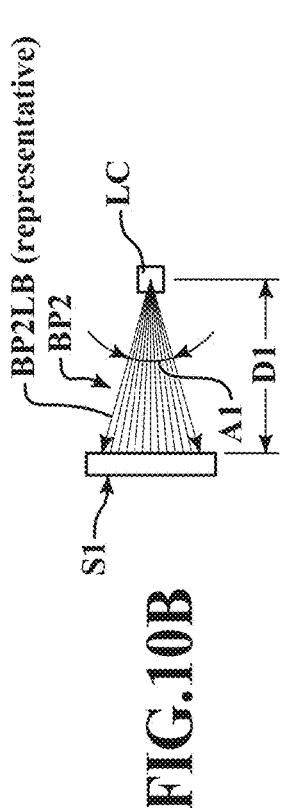

FIGS. 10A and 10B are diagrams illustrating a light beam source configuration LC at a first distance D1 and a second distance D2, respectively, from a light beam sensor S1, and providing a second pattern of light beams BP2. As illustrated in FIGS. 10A and 10B, the second pattern of light beams BP2 has a higher density of second pattern light beams BP2LB (e.g., as compared to the first pattern of light beams BP1 with the relatively lower density of first pattern light beams BP1LB of FIGS. 9A and 9B). In the example of FIGS. 10A and 10B, the angle A1 is referenced as being approximately 30 degrees, and the second pattern light beams BP2LB are indicated as having an angular spacing of approximately 2.5 degrees, such that in the two-dimensional illustrations of FIGS. 10A and 10B, there are thirteen second pattern light beams BP2LB illustrated for the 30 degree range of angle A1. It will be appreciated that these example numbers of light beams are chosen for illustrative purposes and in certain implementations the number of light beams (e.g., in a typical implementation) that are produced by the light beam source configuration may be much higher (e.g., on the order of 10,000 or more light beams).

As illustrated in FIG. 10A, the light beam source configuration LC is at the distance D2 from the sensor S1. At the distance D2, and with the angular spacing/angular dispersion corresponding to the higher density of the second pattern light beams BP2LB, it is indicated that three of the second pattern light beams BP2LB are directed toward the light beam sensor S1 and correspondingly produce three measurement spots on the light beam sensor S1 (e.g., which in this instance is regarded as an example of a desirable number of measurement spots). As shown in FIG. 10B, the light beam source configuration LC is at the distance D1 from the light beam sensor S1, for which given the angular spacing/angular dispersion of the second pattern light beams BP2LB, it is indicated that thirteen second pattern light beams BP2LB are directed toward the light beam sensor S1, and correspondingly form thirteen measurement spots on the light beam sensor S1. In one particular implementation, this may be regarded as an example of too many measurement spots being formed on the light beam sensor S1 (e.g., for which the measurement spots may overlap and/or may otherwise make it difficult for the metrology system to determine/distinguish the measurement spots and the corresponding light beams and/or may cause other issues with the processing, etc.).

As a comparison between FIGS. 9A-9B and 10A-10B, it is noted that as illustrated in FIG. 9A, with the light beam source configuration LC at the distance D1 from the light beam sensor S1, the first pattern of light beams BP1 may produce a desirable number of measurement spots on the light beam sensor S1. It is also noted that as illustrated in FIG. 10A, with the light beam source configuration LC at the distance D2 from the light beam sensor S1, the second pattern of light beams BP2 may produce a desirable number of measurement spots on the light beam sensor S1. As will be described in more detail below, in accordance with principles as described herein, in various implementations a light beam source configuration LC may be provided that is configured to direct both the first pattern of light beams BP1 and the second pattern of light beams BP2 to light beam sensors of the sensor configuration 160, to indicate a position and orientation of the light beam source configuration LC.

Figure 11A:
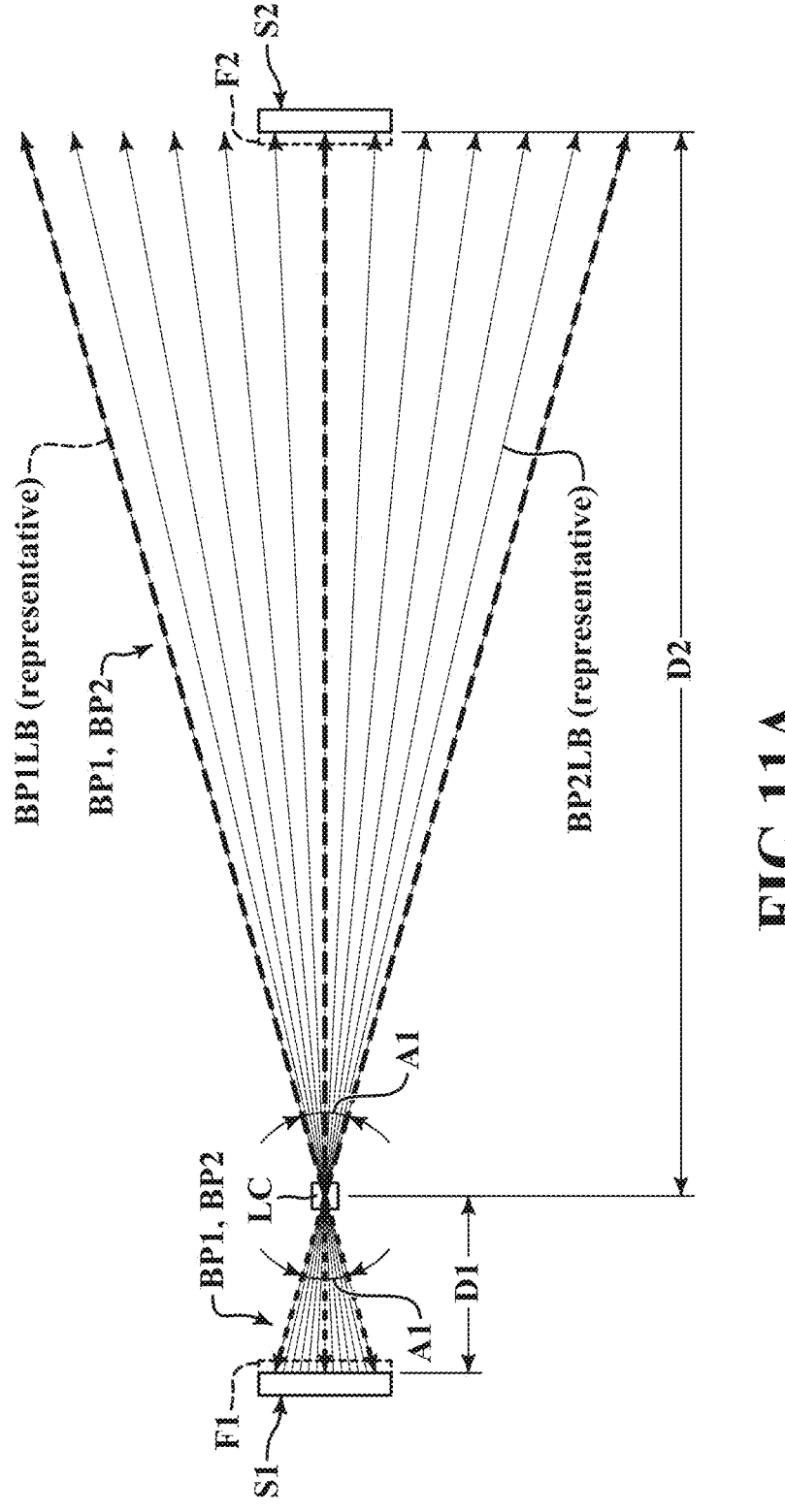
FIGS. 11A and 11B are diagrams illustrating a light beam source configuration at first and second distances from first and second light beam sensors, and providing first and second patterns of light beams.
Figure 11B:
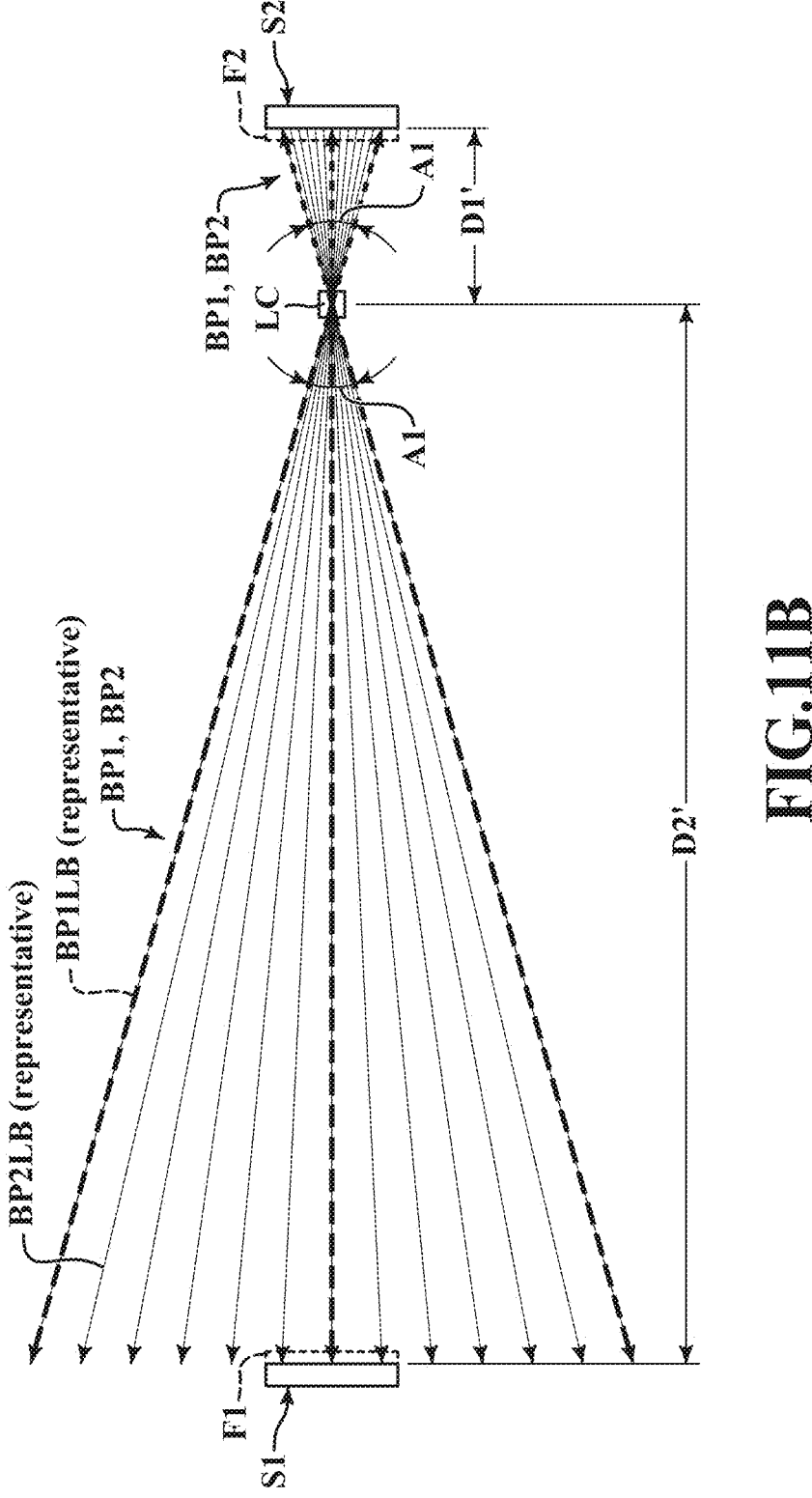

FIGS. 11A and 11B are diagrams illustrating a light beam source configuration LC at first and second distances from first and second light beam sensors S1 and S2, and providing first and second patterns of light beams BP1 and BP2. As illustrated in FIG. 11A, the light beam source configuration LC is at the distance D1 from the light beam sensor S1 and is at the distance D2 from the light beam sensor S2. The example is noted to be similar to that of FIGS. 1 and 5F, for which the light beam source configuration LC is illustrated as being relatively closer to the light beam sensor S1 and relatively further from the light beam sensor S2 (e.g., and for which the configuration and techniques as described below may be utilized).

In the example of FIG. 11A, the first pattern of light beams BP1 forms a desirable number of measurement spots (e.g., three measurement spots) on the light beam sensor S1 (e.g., similar to the example of FIG. 9A), and the second pattern of light beams BP2 forms a desirable number of measurement spots (e.g., three measurement spots) on the light beam sensor S2 (e.g., similar to the example of FIG. 10A). In accordance with principles as described herein, the first pattern light beams BP1LB and the second pattern light beams BP2LB have at least one different characteristic that enables the first pattern light beams BP1LB to be distinguished from the second pattern light beams BP2LB. As some examples, in various implementations the at least one different characteristic may be at least one of a different wavelength, a different polarity, a different timing of transmission, etc.

In various implementations, the metrology system includes one or more light beam selecting portions that are configured to operate based on the at least one different characteristic. For example, as will be described in more detail below, in various implementations the one or more selecting portions may comprise one or more light beam filtering portions (e.g., for which there may be a light beam filtering portion in front of each light beam sensor, such as the light beam filtering portions F1 and F2 illustrated in the example of FIGS. 11A and 11B, as will be described in more detail below). In various implementations, a light beam selecting portion of the system may comprise part of the processing portion 190 or other processing portion that selects, filters and/or blocks signals produced by light beams, as may operate based on at least one different characteristic of the light beams (e.g., as based on at least one of a different wavelength, a different polarity, a different timing of transmission, etc.) As will be described in more detail below, in various implementations the light beam filtering portions F1 and F2 may be included as positioned in front of the light beam sensors S1 and S2, respectively. In various implementations, the light beam filtering portions F1 and F2 (e.g., in some implementations comprising motorized filter wheels which are configured to be electronically controlled to rotate or otherwise move respective filters in front of the respective sensors, or having other configurations) may include at least one of a wavelength filter or a polarity filter, etc. In the example of FIG. 11A, with the light beam source configuration LC at the distance D1 from the light beam sensor S1, the light beam filtering portion F1 may include a filter that is positioned (e.g., rotated, moved, or otherwise utilized) in front of the first light beam sensor S1 for blocking or otherwise performing filtering with respect to the second pattern light beams BP2LB. In this manner, the light beam sensor S1 may be made to only produce and/or provide measurement signals based on measurement spots produced by first pattern light beams BP1LB (e.g., as corresponding to the desirable number of measurement spots described above with respect to FIG. 9A).

In various implementations, the light beam filtering portion F1 may be utilized (e.g., moved into position in front of the light beam sensor S1, or otherwise utilized) based on a determined position of the light beam source configuration LC (e.g., as corresponding to the distance D1 of the light beam source configuration LC from the light beam sensor S1). For example, the motion control system 140 of the movement system 110 may be configured to provide position information which indicates (e.g., with movement system accuracy) a distance corresponding to the distance D1 of the light beam source configuration LC from the light beam sensor S1. Based at least in part on the distance indicated by the position information from the motion control system 140, the filtering portion F1 and/or other techniques may be utilized such that the second pattern light beams BP2LB that are directed toward the light beam sensor S1 are not utilized to cause the first light beam sensor S1 to produce measurement signals for the processing by the processing portion 190 (e.g., for determining the position and orientation of the light beam source configuration LC).

As noted above, in various implementations, the light beam filtering portion F1 may be utilized (e.g., as rotated or otherwise moved in front of the first light beam sensor S1) for blocking the second pattern light beams BP2LB. In other implementations, (e.g., as will be described in more detail below with respect to FIG. 13) the light beam filtering portion F1 may comprise a color filter array (e.g., an array comprising different filters for different colors, such as an RGB color filter array of a light beam sensor). The light beam sensor S1 with the color filter array of the light beam filtering portion F1 may be electronically controlled and/or processed (e.g., so as to at certain times only utilize the first pattern light beams BP1LB rather than the second pattern light beams BP2LB to cause the light beam sensor S1 to produce measurement signals for the processing by the processing portion 190). For example, in certain implementations, the color filter array may include red wavelength filter portions which only allow red light through, and blue wavelength filter portions that only allow blue light through, and the first pattern light beams BP1LB may consist of red light, and the second pattern light beams BP2LB may consist of blue light. In such implementations, the signals may be processed such that only the red first pattern light beams BP1LB are utilized (e.g., only the signals from the pixels with the red filter portions are utilized), and the blue second pattern light beams BP2LB are not utilized (e.g., any signals from the pixels with the blue filter portions are not utilized), to cause the light beam sensor S1 to produce measurement signals for the processing by the processing portion 190 (e.g., for determining the position and orientation of the light beam source configuration LC).

In certain implementations, the first pattern light beams BP1LB and the second pattern light beams BP2LB may have different timings of transmission. As one example, the first pattern light beams BP1LB may be transmitted at certain odd numbered timing increments, while the second pattern light beam BP2LB may be transmitted at certain even numbered timing increments. In various implementations, the metrology system 100 may include a light beam selecting portion (e.g., as part of the processing portion 190 or otherwise) that is configured to at certain times utilize signals from the light beam sensor S1 corresponding to measurement spots produced by first pattern light beams BP1LB, and to not utilize signals from the light beam sensor S1 corresponding to measurement spots produced by the second pattern light beams BP2LB. Such filtering may be performed based on timing of when the measurement spots are produced on the light beam sensor S1 (i.e., as corresponding to the timing of transmission). As noted above, such filtering may be performed so that signals resulting from measurement spots produced by the first pattern light beams BP1LB are utilized, and signals resulting from measurement spots produced by second pattern light beams BP2LB are not utilized, for the processing by the processing portion 190 (e.g., for determining the position and orientation of the light beam source configuration LC).

In the example of FIG. 11B, in comparison to the example of FIG. 11A, the light beam source configuration LC has been moved to be further from the light beam sensor S1, and to be closer to the light beam sensor S2. In particular, the light beam source configuration LC is illustrated as being at a distance D1' from the light beam sensor S2 and at a distance D2' from the light beam sensor S1. In various implementations, the distances D1' and D2' may be similar or identical to the distances D1 and D2 of FIG. 11A, or may be different. In the example of FIG. 11B, the metrology system may be configured such that the first pattern light beams BP1LB that are directed to the light beam sensor S2 are utilized to produce measurement spots that cause the light beam sensor S2 to produce measurement signals while the second pattern light beams BP2LB that are directed to the light beam sensor S2 are not so utilized for the processing by the processing portion 190 (e.g., for determining the position and orientation of the light beam source configuration LC). In contrast, the second pattern light beams BP2LB that are directed to the light beam sensor S1 at the distance D2' may be utilized to produce measurement spots that cause the light beam sensor S1 to produce measurement signals for the processing by the processing portion 190 (e.g., for determining of the position and orientation of the light beam source configuration LC).

In various implementations, the light beam filtering portions F1 and F2 (and/or other filtering portion(s) of the system) may also include a portion that can be utilized (e.g., moved in front of a corresponding light beam sensor or otherwise utilized) to block or otherwise perform filtering with respect to first pattern light beams BP1LB. For example, in the configuration of FIG. 11A, when the light beam source configuration LC is determined to be at the distance D2 from the light beam sensor S2, a portion of the light beam filtering portion F2 (e.g., or other filtering portion of the system) may be utilized to prevent first pattern light beams BP1LB from forming measurement spots on the light beam sensor S2 and/or otherwise prevent the utilization of such measurement signals corresponding to the first pattern light beams BP1LB. Such an implementation may be utilized, for example, in a configuration that most effectively functions when the light beam sensor S2 only receives and/or processes one of first or second pattern light beams at a time. In such a configuration, in the example of FIG. 11A, it may be desirable for the light beam sensor S2 to only receive and/or process (e.g., process measurement signals resulting from measurement spots produced by) the second pattern light beams BP2LB and not the first pattern light beams BP1LB.

In other implementations, the system may be configured to function effectively with the light beam sensor S2 receiving (e.g., having measurement spots produced by) both first and second pattern light beams BP1LB and BP2LB simultaneously. For example, the first pattern of light beams BP1 and the second pattern of light beams BP2 may be configured such that the light beams do not overlap or otherwise cause issues if they provide light beams that are simultaneously received at and produce measurement spots on the corresponding light beam sensor (e.g., the light beam sensor S2). With respect to the concern of too many measurement spots being produced on the light beam sensor S2 in FIG. 11A, it is noted that the first pattern light beams BP1LB provide only limited contributions to such issues due to having the relatively lower density in comparison to the relatively higher density of the second pattern light beams BP2LB.

In various implementations, as noted above, in relation to the example of FIG. 11A, the determination as to whether the second pattern light beams BP2LB that are directed toward the first light beam sensor S1 will be prevented from being utilized is based at least in part on a determined distance (e.g., as corresponding to distance D1) of the light beam source configuration LC from the light beam sensor S1. In various implementations, a threshold distance may be specified for which if the determined distance is less than the specified threshold distance, then the second pattern light beams BP2LB may not be utilized. In such a configuration where the determined distance (e.g., corresponding to the distance D1) is less than the threshold distance, then only measurement signals corresponding to the first pattern light beams BP1LB may be utilized for the processing by the processing portion 190 (e.g., for determining the position and orientation of the light beam source configuration LC).

In various implementations, the determination of the distance (e.g., corresponding to distance D1) of the light beam source configuration LC from a light beam sensor (e.g., light beam sensor S1) may be determined based at least in part on position information provided from the motion control system 140 of the movement system. As described herein, the motion control system 140 may provide position information which indicates with movement system accuracy the position of the light beam source configuration LC (e.g., within a metrology frame volume MFV) which may correspondingly indicate with movement system accuracy a distance of the light beam source configuration LC from a light beam sensor (e.g., from the light beam sensor S1), and for which the fixed locations of the light beam sensors relative to the metrology frame volume are known. Alternatively or in addition, other data may be utilized for determining (e.g., estimating, projecting, etc.) a distance (e.g., corresponding to the distance D1) of the light beam source configuration LC from a light beam sensor (e.g., the light beam sensor S1). For example, last known position data for the light beam source configuration LC, speed data, direction data, etc. (e.g., as determined by motion control system 140 and/or otherwise by the metrology system 100) may be utilized to determine (e.g., in combination with current position data from the movement system 110 and/or movement estimates, projections, etc.) a current distance (e.g., corresponding to distance D1) of the light beam source configuration LC from a light beam sensor (e.g., from light beam sensor S1). As noted above, the determined distance (e.g., corresponding to distance D1) may in some implementations be compared to a specified threshold distance and/or otherwise be evaluated or utilized for determining if certain pattern light beams (e.g., second pattern light beams BP2LB) and/or signals corresponding thereto will be utilized, or blocked or otherwise not utilized, in relation to the measurement signals to be processed by the processing portion 190 (e.g., for determining the position and orientation of the light beam source configuration LC).

For certain configurations, there may generally be little or no time penalty in regard to measuring/making determinations with regard to both patterns of light beams (e.g. in configurations utilizing time-multiplexing with different timings of transmission, or utilizing the color filter array CFA, etc.). For such configurations or otherwise, in various implementations the images from the light beam sensors may be examined to see which pattern of light beams may be best to utilize for the processing (e.g., for determining the position and orientation of the light beam source configuration). For example, the images from the light beam sensors may be examined to determine which pattern of light beams produces at least one measurement spot and for which the measurement spots are not overlapping. As a more specific example, for a given light beam sensor, if the images indicate that the measurement spots produced by the second pattern of light beams BP2 are overlapping, and that the first pattern of light beams BP1 produces at least one measurement spot on the light beam sensor, then the first pattern of light beams BP1 may be utilized and the second pattern of light beams BP2 may not be utilized (e.g., the image with the one or more measurement spots corresponding to the first pattern of light beams BP1 may be utilized and the image with the measurement spots corresponding to the second pattern of light beams BP2 may not be utilized). As another example, for the given light beam sensor, if the images indicate that no measurement spots are produced on the light beam sensor by the first pattern of light beams BP1, and that at least one measurement spot is produced on the light beam sensor by the second pattern of light beams BP2, then the second pattern of light beams BP2 may be utilized (e.g., the image with the one or more measurement spots corresponding to the second pattern of light beams BP2 may be utilized).

For certain applications, there may be various numbers of light beam sensors included in the sensor configuration 160, for which corresponding distances of the light beam source configuration from the different light beam sensors may be determined (e.g., compared to a threshold distance, etc.). In relation to the example of FIG. 4B, it will be appreciated that in certain implementations the sensor configuration 160 may include many light beam sensors. It will be appreciated that in such configurations, if the light beam source configuration is closer to one side (e.g., or one corner) of the metrology frame volume MFV, then the light beam source configuration may correspondingly be closer to the light beam sensors on that side (e.g., or corner) of the metrology frame volume, while being further from the light beam sensors on the opposite side (e.g., or opposite corner) of the metrology frame volume.

Figure 12:
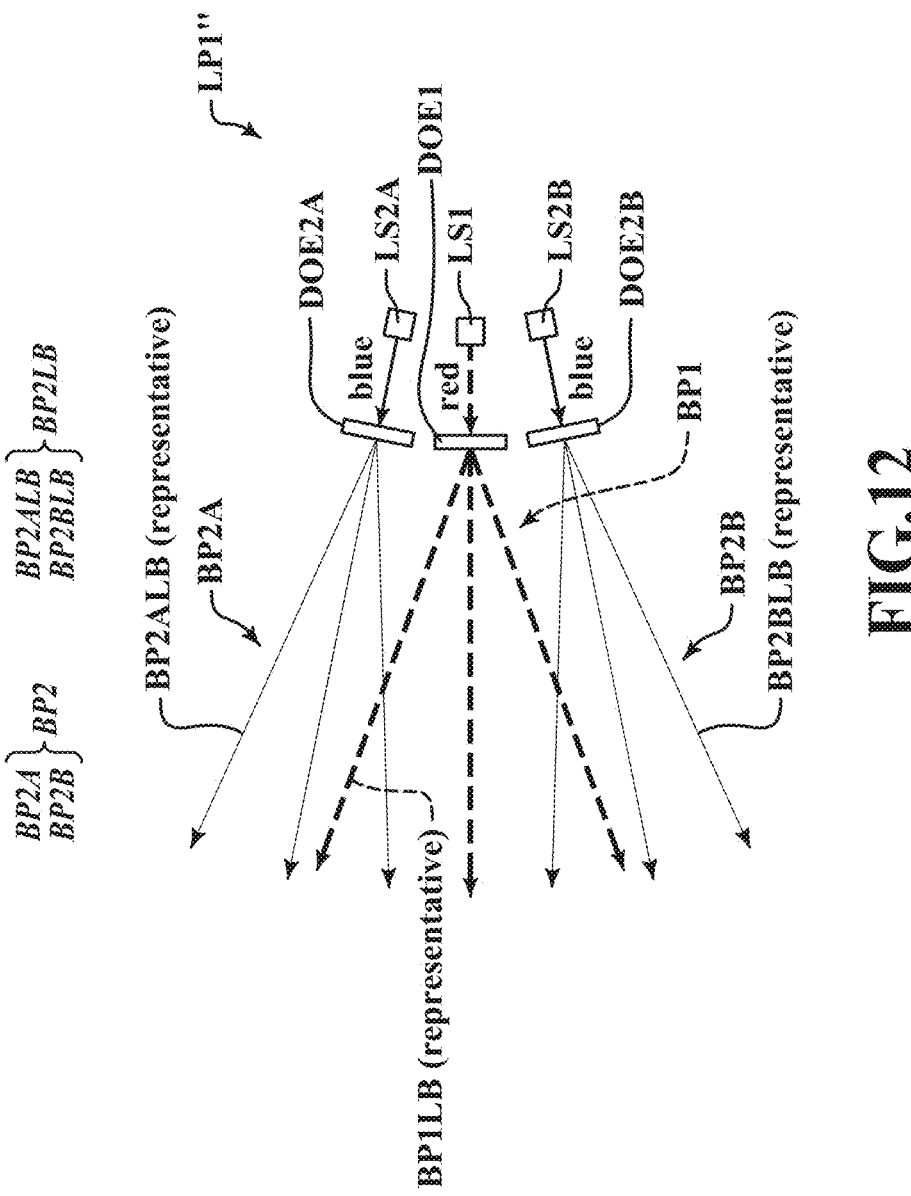
FIG. 12 is a diagram of a first exemplary implementation of a light beam source portion of a light beam source configuration such as may be utilized to provide first and second patterns of light beams.

FIG. 12 is a diagram of a first exemplary implementation of a light beam source portion LP1" of a light beam source configuration such as may be utilized to provide first and second patterns of light beams BP1 and BP2. As illustrated in FIG. 12, the light beam source portion LP1" includes light sources LS1, LS2A, LS2B, and diffractive optical elements DOE1, DOE2A and DOE2B. The light source LS1 provides light corresponding to a first wavelength, such as corresponding to red light in the illustrated example. The diffractive optical element DOE1 receives the light from the light source LS1, and diffracts the light to form a first pattern of light beams BP1 which includes first pattern light beams BP1LB.

The light sources LS2A and LS2B provide light corresponding to a second wavelength, such as corresponding to blue light in the illustrated example. The diffractive optical elements DOE2A and DOE2B receive the light from the light sources LS2A and LS2B, respectively, and diffract the light to form second patterns of light beams BP2A and BP2B, respectively. The second patterns of light beams BP2A and BP2B include second patterns light beams BP2ALB and BP2BLB, respectively. The second patterns of light beams BP2A and BP2B in combination may be referenced as a second pattern of light beams BP2. The second pattern light beams BP2ALB and BP2BLB may both be characterized as being second pattern light beams BP2LB.

Similar to the previous examples, the first pattern of light beams BP1 has a lower density of first pattern light beams BP1LB (e.g., with a corresponding wider angular spacing/ angular dispersion) in relation to the second pattern of light beams BP2 which has a higher density of second pattern light beams BP2LB (e.g., with a corresponding narrower angular spacing/angular dispersion). It will be appreciated that the first wavelength (e.g., corresponding to red light) of the first pattern light beams BP1LB and the second wavelength (e.g., corresponding to blue light) of the second pattern light beams BP2LB correspond to a different characteristic that enables the first pattern light beams BP1LB to be distinguished from the second pattern light beams BP2LB. As noted above, in one example, a light beam filtering portion (e.g., a light beam filler portion F1 or F2) may include a filter (e.g., a color filter), such as a red color filter that will enable the first pattern light beams BP1LB to pass through to form measurement spots on a corresponding light beam sensor and/or certain pixels thereof, while blocking second pattern light beams BP2LB (e.g., to prevent the second pattern light beams BP2LB from producing measurement spots on the light beam sensor and/or certain pixels thereof).

Figure 13:
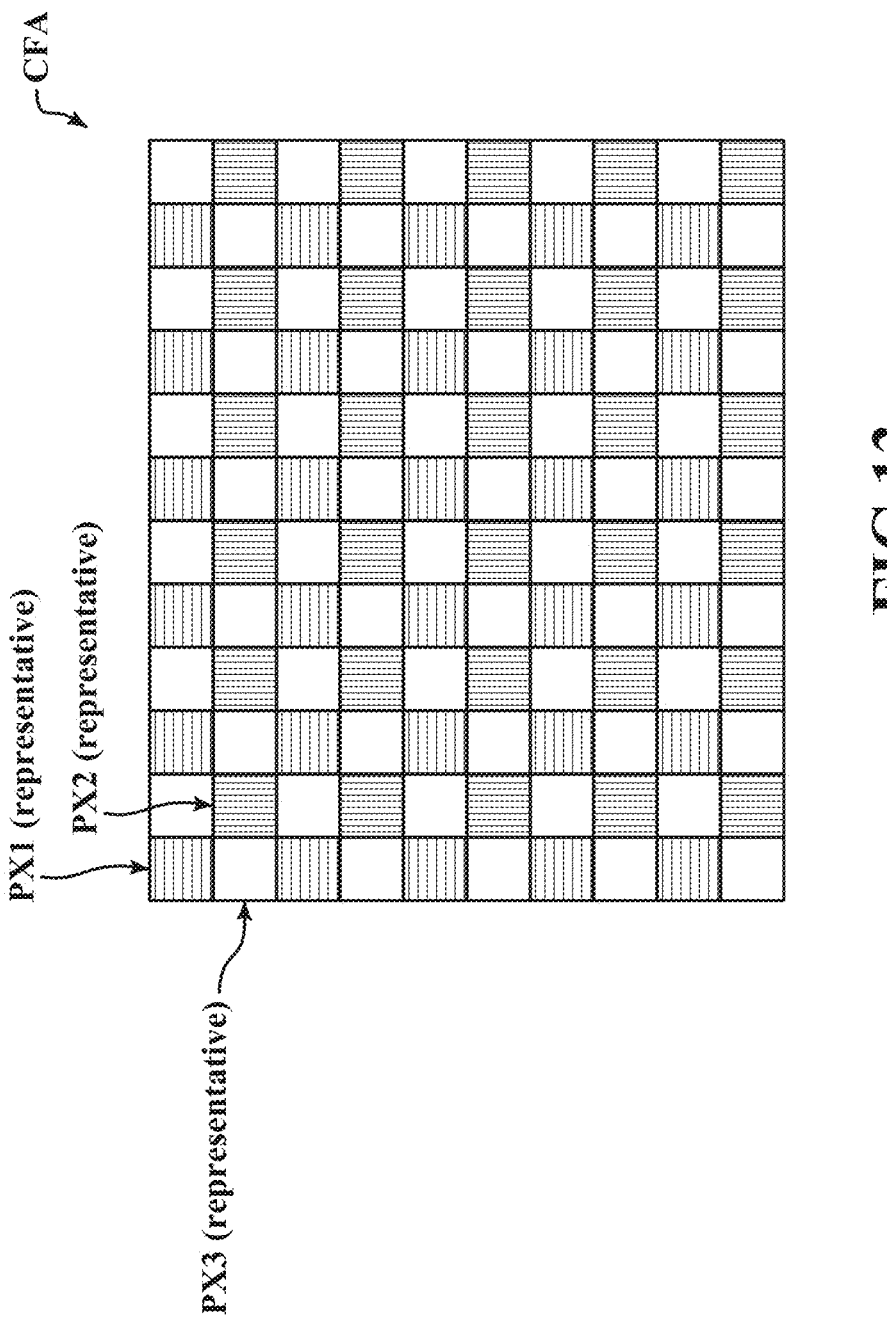
FIG. 13 is a diagram of a color filter array such as may be utilized to filter patterns of light beams.

FIG. 13 is a diagram of a color filter array CFA (e.g., such as may be utilized to filter patterns of light beams that are of different colors). In some implementations, the color filter array CFA may be a built-in component of the light beam sensors (e.g., which in some instances may be types of color cameras, etc.) In the example of FIG. 13, the color filter array CFA includes three types of pixel filter portions PX1, PX2, and PX3. In various implementations, the pixel filter portions PX1 may correspond to red filter portions, while the pixel filter portions PX2 may correspond to blue filter portions, and the pixel filter portions PX3 may correspond to green filter portions. As described above with respect to FIG. 12, in one implementation the first pattern light beams BP1LB are red, and the second pattern light beams BP2LB are blue. In such an implementation, a light beam filter portion (e.g., light beam filter portion F1 or F2) including the color filter array CFA of FIG. 13 may be utilized to determine/control whether certain pattern light beams (e.g., second pattern light beams BP2LB) are utilized to produce measurement signals for the processing by the processing portion 190 (e.g., for determining the position and orientation of the light beam source configuration LC).

As an example, if the second pattern light beams BP2LB are not to be utilized, then the light beam sensor with the color filter array CFA may be controlled such that the pixels corresponding to the pixel filter portions PX2 (e.g., with the blue filter portions) are not utilized to provide measurement signals for the processing by the processing portion 190 (e.g., for the determination of the position and orientation of the light beam source configuration LC). In such a configuration, the light beam sensor with the coloring filter array CFA may be controlled such that the signals from the pixels corresponding to the pixel filter portions PX1 (e.g., with the red filter portions), and which correspondingly produce measurement signals based on measurement spots formed by first pattern light beams PB1LB (e.g., red light beams), may be utilized for the processing by the processing portion 190 (e.g., for determining the position and orientation of the light beam source configuration LC).

Figure 14:
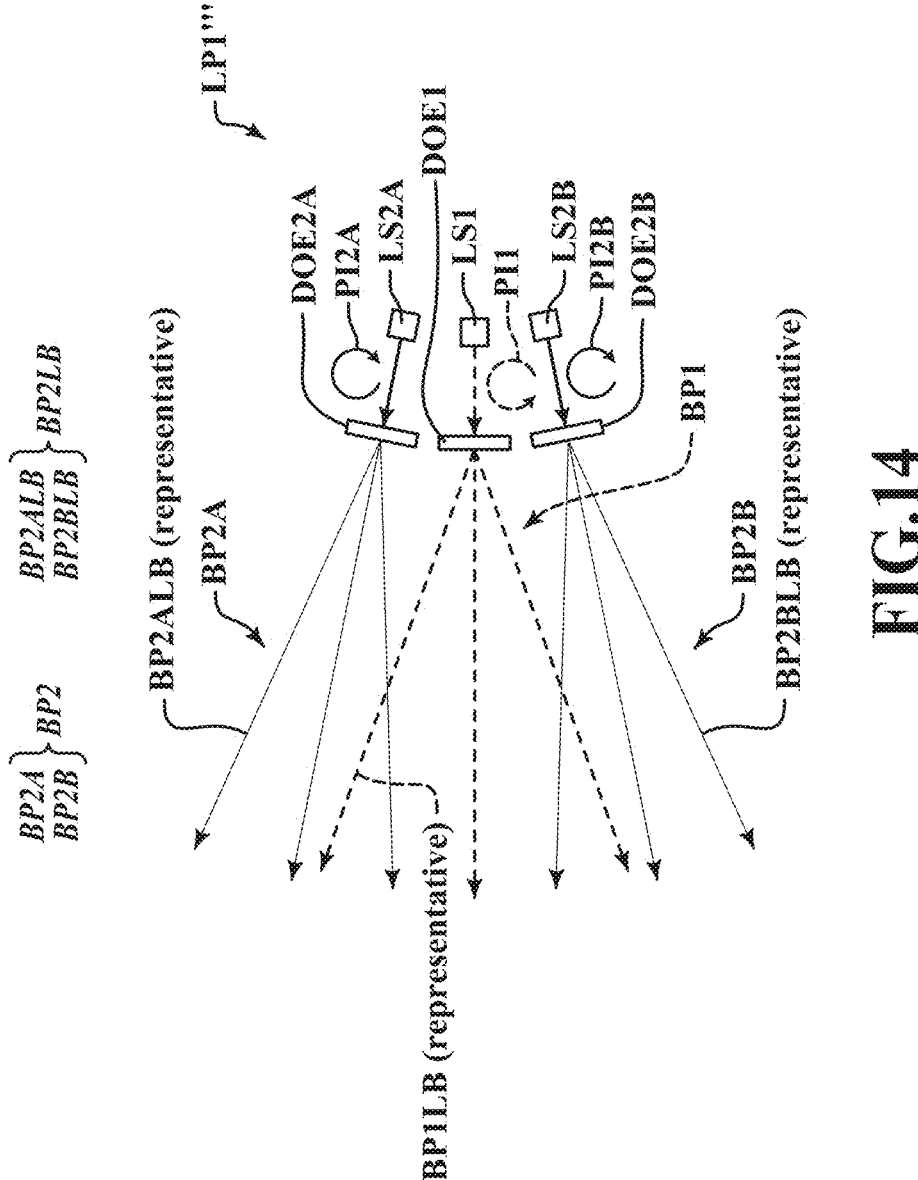
FIG. 14 is a diagram of a second exemplary implementation of a light beam source portion of a light beam source configuration such as may be utilized to provide first and second patterns of light beams.

FIG. 14 is a diagram of a second exemplary implementation of a light beam source portion LP1''' of a light beam source configuration such as may be utilized to provide first and second patterns of light beams BP1 and BP2. In the example of FIG. 14, the light beam source portion LP1''' includes light sources LS1, LS2A, and LS2B and diffractive optical elements DOE1, DOE2A, and DOE2B. In some implementations, separate polarizing elements (not shown) may also be provided. In the example of FIG. 14, the light source LS1 directs light with a first circular polarization to the diffractive optical element DOE1, which diffracts the light to form the first pattern of light beams BP1, which includes a relatively lower density of first pattern light beams BP1LB.

The light sources LS2A and LS2B direct light with a second circular polarization (i.e., which is opposite to the first circular polarization of the light directed by the light source LS1), which is received and diffracted by the diffractive optical elements DOE2A and DOE2B to form the second patterns of light beams BP2A and BP2B, which include a relatively higher density of second pattern light beams BP2ALB and BP2BLB. In various implementations, the second pattern of light beams BP2 may be characterized as including the second patterns of light beams BP2A and BP2B, and the second pattern light beams BP2LB may be characterized as including the second pattern light beams BP2ALB and BP2BLB.

The first circular polarization of the light directed from the first light source is indicated by a first polarization indicator P11, and the second circular polarization (e.g., which is opposite to the first circular polarization) of the light directed by the light sources LS2A and LS2B is indicated by polarization indicators P12A and P12B. In various implementations, the first circular polarization of the first pattern light beams BP1LB and the second circular polarization of the second pattern light beams BP2LB correspond to a different characteristic that enables the first pattern light beams BP1LB to be distinguished from the second pattern light beams BP2LB. As an example, in one implementation, a light beam filtering portion (e.g., such as the light beam filtering portion F1 or F2) may include a polarization filter for filtering particular light beams. With reference to the example of FIG. 11A, the light beam filtering portion F1 may include a polarization filter that enables the first pattern light beams BP1LB with the first circular polarization to pass through (e.g., and form measurement spots on the light beam sensor S1), while blocking the second pattern light beams BP2LB with the second circular polarization.

Figure 15:
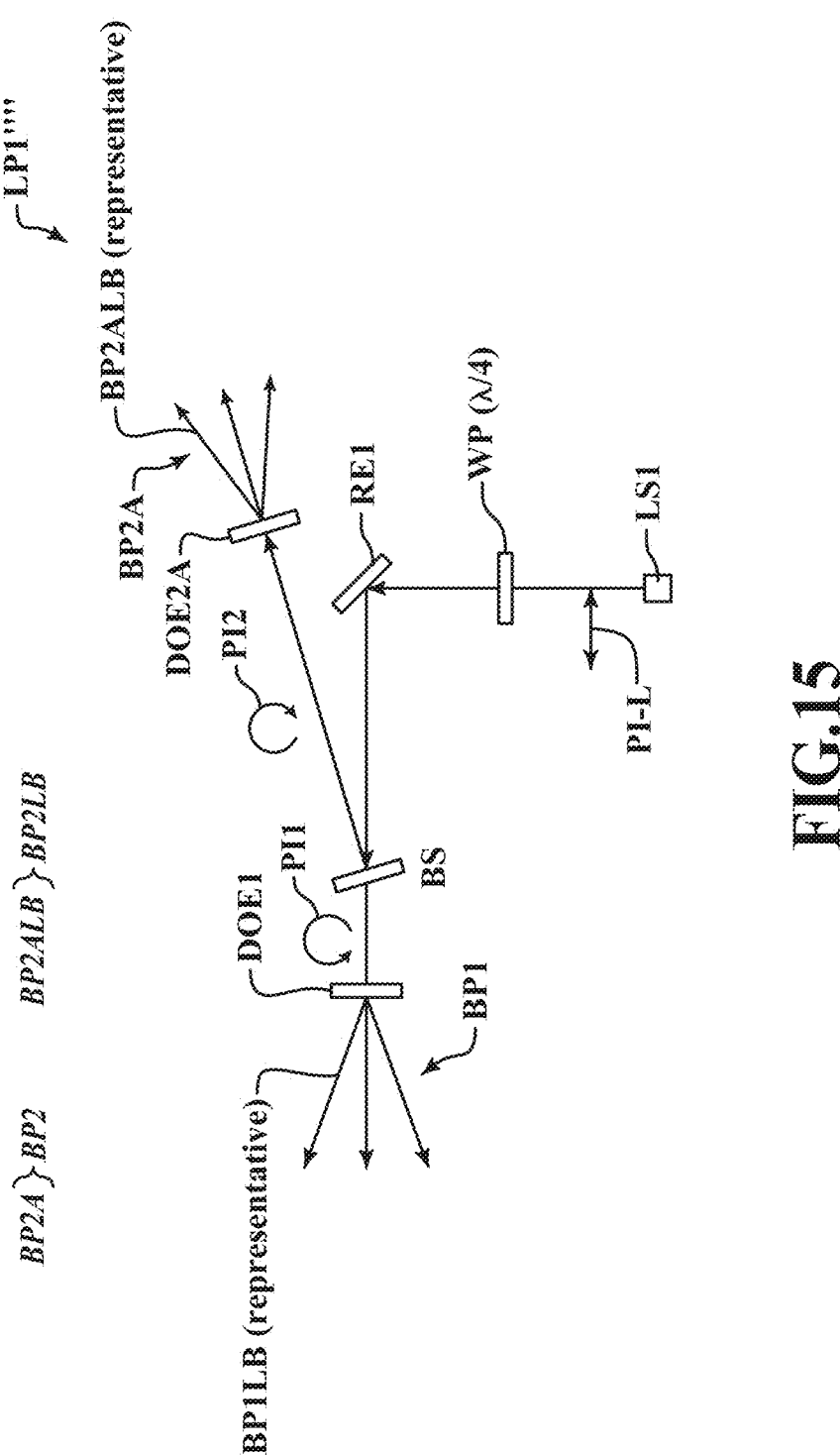
FIG. 15 is a diagram of a third exemplary implementation of a light beam source portion of a light beam source configuration such as may be utilized to provide first and second patterns of light beams.

FIG. 15 is a diagram of a third exemplary implementation of a light beam source portion LP1'''' of a light beam source configuration such as may be utilized to provide first and second patterns of light beams BP1 and BP2. In the example of FIG. 15, the light beam source portion LP'''' includes a light source LS1, a wave plate WP, a reflective element RE1, a beam splitter BS and diffractive optical elements DOE1 and DOE2A. The light from the light source LS1 is indicated by a polarization indicator PI-L to have a linear polarization, and is provided to a wave plate WP (e.g., a quarter wave plate) and is reflected by the reflective surface RE1 toward the beam splitter BS. In various implementations, the reflection of the near-normal beam splitter BS changes a sign of circular polarization of the light, and may thus reduce a required number of quarter wave plates (e.g., for which the illustrated configuration only includes the single quarter wave plate WP). In some implementations, a circular polarizer may be utilized as an alternative to a wave plate. The light transmitted through the beam splitter BS is indicated by a polarization indicator P11 to have a first circular polarization, and the light reflected from the beam splitter BS is indicated by a second polarization indicator P12 to have a second circular polarization (e.g., which is opposite to the first circular polarization).

The light with the first circular polarization is diffracted by the first diffractive optical element DOE1 to form the first pattern of light beams BP1 which includes the first pattern light beams BP1LB with the relatively lower density and which have the first circular polarization. The light with the second circular polarization is diffracted by the diffractive optical element DOE2A to form the second pattern of light beams BP2A which includes the second pattern light beams BP2ALB with the relatively higher density and which have the second circular polarization. In various implementations, the second pattern of light beams BP2A and the second pattern light beams BP2BLB may correspond to the second pattern of light beams BP2 and the second pattern light beams BP2LB (e.g., similar to those of FIG. 14). The first polarization of the first pattern light beams BP1LB and the second polarization (e.g., which is opposite to the first polarization) of the second pattern light beams BP2LB correspond to a different characteristic that enables the first pattern light beams BP1LB to be distinguished from the second pattern light beams BP2LB, similar to the example described above with respect to FIG. 14.

In relation to the examples of FIGS. 12, 14 and 15, in various implementations the diffractive optical elements DOE for producing the different patterns of light beams may have different characteristics (e.g., in relation to the corresponding angles of dispersion and/or for operating in relation to the different characteristics of the first and second patterns of light beams, etc.). In certain implementations, other configurations may also be utilized as part of the light beam source configuration for providing the first and second patterns of light beams. For example, certain types of variable projectors (e.g., a variable projector chip) may be utilized, which may be configured to produce and switch between different patterns of light beams utilizing a single device. In one implementation of such a configuration, the first and second patterns of light beams may be provided with different timings of transmission. In various implementations, meta surfaces and/or meta materials may also or alternatively be utilized for producing the patterns of light beams with the different characteristics. For example, a configuration utilizing such meta surfaces and/or meta materials may utilize only a single light source from which different wavelengths may be produced for the first and second patterns of light beams, or alternatively different light sources may be utilized and provide different wavelengths, but as directed to a common configuration utilizing meta surfaces and/or meta materials (e.g., functioning similarly to a common diffractive optical element or arrangement of such elements) for providing the first and second patterns of light beams.

FIG. 16 is a flow diagram illustrating one exemplary implementation of a routine 1600 for operating a metrology system. At a block 1610, a light beam source configuration (i.e., of the metrology system) is operated to direct a first pattern of light beams BP1 and a second pattern of light beams BP2 to light beam sensors of a sensor configuration (i.e., of the metrology system) to indicate a position and orientation of the light beam source configuration. In various implementations, the light beam source configuration is coupled to at least one of an end tool or an end tool mounting configuration of a movement system that moves the end tool. The position and orientation of the light beam source configuration are indicative of a position and orientation of the end tool. The sensor configuration comprises a plurality of light beam sensors located at fixed positions, including at least a first light beam sensor at a first position and a second light beam sensor at a second position. At least some of the light beams that are directed to and received at the light beam sensors produce measurement spots in positions on the light beam sensors that cause the light beam sensors to produce corresponding measurement signals. The first pattern of light beams BP1 has a lower density of first pattern light beams BP1LB in relation to the second pattern of light beams BP2 which has a higher density of second pattern light beams BP2LB.

At a block 1620, the measurement signals from the light beam sensors of the sensor configuration are processed to determine a position and orientation of the light beam source configuration. For at least a first position of the light beam source configuration that is a first distance from the first light beam sensor and a second distance from the second light beam sensor, with the second distance being greater than the first distance: one or more first pattern light beams BP1LB that are directed toward the first light beam sensor are utilized to cause the first light beam sensor to produce measurement signals for the processing to determine the position and orientation, and second pattern light beams BP2LB that are directed toward the first light beam sensor are not utilized to cause the first light beam sensor to produce measurement signals for the processing to determine the position and orientation. In addition, one or more second pattern light beams BP2LB that are directed toward the second light beam sensor are utilized to cause the second light beam sensor to produce measurement signals for the processing to determine the position and orientation.

In various implementations, the routine 1600 may further include receiving position information from the movement system 110 that moves the end tool ETL, wherein the position information from the movement system 110 indicates with movement system accuracy a first distance of the light beam source configuration LC from the first light beam sensor, and based at least in part on the first distance as indicated by position information from the movement system 110, the second pattern light beams BP2LB that are directed toward the first light beam sensor are not utilized to cause the first light beam sensor to produce measurement signals for the processing to determine the position and orientation.

In various implementations, for at least a second position of the light beam source configuration LC that is a third distance from the first light beam sensor and a fourth distance from the second light beam sensor, with the third distance being greater than the fourth distance: one or more first pattern light beams BP1LB that are directed toward the second light beam sensor are utilized to cause the second light beam sensor to produce measurement signals for the processing to determine the position and orientation, and second pattern light beams BP2LB that are directed toward the second light beam sensor are not utilized to cause the second light beam sensor to produce measurement signals for the processing to determine the position and orientation; and one or more second pattern light beams BP2LB that are directed toward the first light beam sensor are utilized to cause the first light beam sensor to produce measurement signals for the processing to determine the position and orientation.

The following describes various exemplary embodiments of the present disclosure with various features and elements annotated with reference numerals found in FIGS. 1-16. It should be understood that the reference numerals are added to indicate exemplary embodiments, and the features and elements are not limited to the particular embodiments illustrated in FIGS. 1-16.

As described herein, a metrology system 100 is provided for use with a movement system 110 that moves an end tool ETL. The movement system 110 comprises a movable configuration MAC and a motion control system 140. The movable configuration MAC comprises an end tool mounting configuration ETMC that an end tool ETL is configured to mount to. The motion control system 140 is configured to control an end tool position and orientation, based at least in part on controlling the movable configuration MAC so as to move at least a portion of an end tool ETL that is mounted to the end tool mounting configuration ETMC within a movement volume MV.

The metrology system 100 comprises a sensor configuration 160, a light beam source configuration LC and a processing portion 190. The sensor configuration 160 comprises a plurality of light beam sensors S1-S4 located at fixed positions, including at least a first light beam sensor at a first position and a second light beam sensor at a second position. The light beam source configuration LC is configured to direct a first pattern of light beams BP1 and a second pattern of light beams BP2 to light beam sensors (e.g., including light beam sensors S1-S4) of the sensor configuration 160 to indicate a position and orientation of the light beam source configuration LC.

The light beam source configuration LC is configured to be coupled to at least one of an end tool ETL or the end tool mounting configuration ETMC. At least some of the light beams that are directed to and received at the light beam sensors are configured to produce measurement spots SP in positions on the light beam sensors that cause the light beam sensors to produce corresponding measurement signals. The first pattern of light beams BP1 has a lower density of first pattern light beams BP1LB in relation to the second pattern of light beams BP2 which has a higher density of second pattern light beams BP2LB.

The processing portion 190 is configured to process the measurement signals from light beam sensors of the sensor configuration 160 to determine a position and orientation of the light beam source configuration LC. The metrology system 100 is configured such that for at least a first position of the light beam source configuration LC that is a first distance from the first light beam sensor and a second distance from the second light beam sensor, with the second distance being greater than the first distance: one or more first pattern light beams BP1LB that are directed toward the first light beam sensor are utilized to cause the first light beam sensor to produce measurement signals for the processing by the processing portion 190, and second pattern light beams BP2LB that are directed toward the first light beam sensor are not utilized to cause the first light beam sensor to produce measurement signals for the processing by the processing portion 190; and one or more second pattern light beams BP2LB that are directed toward the second light beam sensor are utilized to cause the second light beam sensor to produce measurement signals for the processing by the processing portion 190.

In various implementations, the first pattern light beams BP1LB and the second pattern light beams BP2LB have at least one different characteristic that enables the first pattern light beams BP1LB to be distinguished from the second pattern light beams BP2LB. In various implementations, the at least one different characteristic is at least one of: a different wavelength; a different polarity; or a different timing of transmission. In various implementations, the metrology system further comprises at least a first light beam selecting portion that is configured to operate based on the at least one different characteristic. In various implementations, the selecting portion may comprise a light beam filtering portion (e.g., for which there may be multiple light beam filtering portions, such as including a light beam filtering portion in front of each light beam sensor, such as illustrated in the example of FIGS. 11A and 11B), and/or may comprise part of the processing portion 190 or other processing portion that selects, filters and/or blocks signals produced by light beams, as may operate based on characteristics such as different timings of transmission of the light beams, etc.

In various implementations, based at least in part on an indication of the first distance of the light beam source configuration LC from the first light beam sensor, the first light beam selecting portion is configured to prevent the second pattern light beams BP2LB that are directed toward the first light beam sensor from being utilized to cause the first light beam sensor to produce measurement signals for the processing by the processing portion 190 (e.g., for determining the position and orientation of the light beam source configuration LC). In various implementations, the first light beam selecting portion is configured to be utilized to at least one of block the second pattern light beams BP2LB from reaching the first light beam sensor or prevent measurement signals resulting from the second pattern light beams BP2LB at the first light beam sensor from the processing by the processing portion 190. As an example of such features, in relation to the illustration of FIG. 11A, based at least in part on an indication of the first distance D1 of the light beam source configuration LC from the first light beam sensor S1, the first light beam selecting portion (e.g., the light beam filtering portion F1) is configured to prevent the second pattern light beams BP2LB that are directed toward the first light beam sensor S1 from being utilized to cause the first light beam sensor S1 to produce measurement signals for the processing by the processing portion 190 (e.g., the light beam filtering portion F1 blocks the second pattern light beams BP2LB from reaching the first light beam sensor S1).

In various implementations, the at least one different characteristic between the first and second pattern light beams BP2LB is at least one of a different wavelength or a different polarity (e.g., as illustrated by the different configurations in FIGS. 12, 14 and 15), and the first light beam selecting portion comprises a first light beam filtering portion (e.g., the light beam filtering portion F1) including at least one of a wavelength filter or a polarity filter that is configured to be moved in front of the first light beam sensor for blocking the second pattern light beams BP2LB. In various implementations, the metrology system 100 further comprises at least a second light beam selecting portion that is configured to operate based on the at least one different characteristic and that comprises a second light beam filtering portion (e.g., light beam filtering portion F2) including at least one of a wavelength filter or a polarity filter, and for which the first and second light beam filtering portions are configured to be utilized for performing filtering for the first and second light beam sensors, respectively (e.g., as illustrated in the examples of FIGS. 11A and 11B).

In various implementations, the metrology system 100 is configured such that for at least a second position of the light beam source configuration LC (e.g., the second position as illustrated in FIG. 11B as compared to the first position as illustrated in FIG. 11A) that is a third distance (e.g., the distance D2') from the first light beam sensor and a fourth distance (e.g., the distance D1') from the second light beam sensor, with the third distance being greater than the fourth distance: one or more first pattern light beams BP1LB that are directed toward the second light beam sensor are utilized to cause the second light beam sensor to produce measurement signals for the processing by the processing portion 190, and second pattern light beams BP2LB that are directed toward the second light beam sensor are not utilized to cause the second light beam sensor to produce measurement signals for the processing by the processing portion 190; and one or more second pattern light beams BP2LB that are directed toward the first light beam sensor are utilized to cause the first light beam sensor to produce measurement signals for the processing by the processing portion 190.

In various implementations, the light beam source configuration LC is configured to simultaneously direct the first pattern of light beams BP1 and the second pattern of light beams BP2 to the light beam sensors of the sensor configuration 160. In various implementations, the motion control system 140 is configured to provide position information which indicates with movement system accuracy a first distance (e.g., the distance D1 of FIG. 11A) of the light beam source configuration LC from the first light beam sensor, and based at least in part on the first distance as indicated by position information from the motion control system 140, the second pattern light beams BP2LB that are directed toward the first light beam sensor are not utilized to cause the first light beam sensor to produce measurement signals for the processing by the processing portion 190. In various implementations, the metrology system includes at least a first light beam selecting portion (e.g., the light beam filtering portion F1, and/or a part of the processing portion 190, etc.), wherein based at least in part on the first distance as indicated by position information from the motion control system 140, the first light beam selecting portion is configured to prevent the second pattern light beams BP2LB that
are directed toward the first light beam sensor from being
utilized to cause the first light beam sensor to produce
measurement signals for the processing by the processing
portion 190.

As one example, based on the determined distance D1, the
light beam filtering portion F1 may be positioned in front of
the first light beam sensor S1 to block the second pattern
light beams BP2LB from reaching the sensing area of the
first light beam sensor S1, such as in a configuration where
the light beam filtering portion F1 is a rotatable light beam
filtering portion with a filter that is operated to be rotated in
front of the first light beam sensor S1. As another example,
the light beam filtering portion F1 may comprise a color
filter array CFA (e.g., as illustrated in FIG. 13) and/or other
component or mechanism that similarly operates (e.g., in
some instances without requiring movement) for filtering the
first pattern light beams BP1LB and/or signals produced
thereby from the second pattern light beams BP2LB and/or
signals produced thereby. As another example, at least part
of the processing portion 190 (or other processing portion)
may be characterized as a light beam selecting portion that
is configured to select signals from the first light beam
sensor S1 that result from the first pattern light beams
BP1LB, but to not select signals from the first light beam
sensor S1 that result from the second pattern light beams
BP2LB (e.g., if the first and second pattern light beams have
first and second timings of transmission, respectively, only
the signals corresponding to the first timing of transmission
may be selected and/or otherwise processed by the process-
ing portion, such as for determining the position and orien-
tation of the light beam source configuration LC).

In various implementations, each of the light beam sen-
sors (e.g., including light beam sensors S1-S4) comprises a
two dimensional position sensitive sensor, for which the
measurement signals from the light beam sensors indicate
the two dimensional positions of measurement spots SP on
the light beam sensors S1-S4 that are produced by light
beams. In various implementations, a metrology frame vol-
ume MFV is defined at least in part by the plurality of light
beam sensors located at the fixed positions, for which the
metrology frame volume MFV is configured to surround at
least part of the movement volume MV and first and second
light beam sensors S1 and S2 are on opposite sides of the
metrology frame volume MFV. In various implementations,
the light beam source configuration LC comprises one or
more diffractive optical elements DOE (e.g., such as the
diffractive optical elements of FIGS. 3, 12, 14 and/or 15) and
at least some of the light beams from the light beam source
configuration LC are diffracted light beams.

In various implementations, the motion control system
140 is configured to sense and control a position and
orientation of the end tool ETL with a level of accuracy
defined as a movement system accuracy, based at least in
part on sensing and controlling the position and orientation
of the end tool ETL using a plurality of position sensors SEN
included in the movable configuration MAC (e.g., as illus-
trated in FIG. 1). The processing portion 190 is operable to
determine a position and orientation of the end tool ETL
with an accuracy level that is better than the movement
system accuracy, based at least in part on processing the
measurement signals from the light beam sensors (e.g., as
including the light beam sensors S1-S4) to determine a
position and orientation of the light beam source configu-
ration LC, and for which the position and orientation of the
light beam source configuration LC are indicative of the
position and orientation of the end tool ETL.

As one example, for a first position of the light beam
source configuration LC (e.g., as illustrated in FIG. 11A), the
light beams directed by the light beam source configuration
LC to the sensor configuration 160 include a first pattern
light beam BP1LB, and a determination of which light beam
sensor the first pattern light beam BP1LB is directed to is
based at least in part on a sensed position and orientation of
the end tool ETL as determined by utilizing the plurality of
position sensors included in the movable configuration
MAC. In this example, the light beam sensor that the first
pattern light beam is directed to is the first light beam sensor
S1, and the processing portion 190 is operable to determine
the position and orientation of the end tool ETL with an
accuracy level that is better than the movement system
accuracy, based at least in part on processing a first mea-
surement signal from the first light beam sensor S1, for
which the first measurement signal indicates a position of a
first measurement spot SP1 as formed by the first pattern
light beam BP1LB on the first light beam sensor S1 (e.g., for
which examples of positions of measurement spots and
corresponding position indications/determinations for the
light beam source configuration and/or end tool ETL are
described above with respect to FIGS. 5A-5H and 6A-6C).

As described above, it may generally be desirable that the
measurement spots that are produced on a light beam sensor
do not overlap. It may also be generally desirable to have at
least one measurement spot produced on a light beam sensor.
In relation to the measurement spots not overlapping (e.g.,
in particular when the measurement spots are relatively
large), it may be desirable for the light beam source con-
figuration to produce a low density of measurement spots
when the light beam source configuration is relatively closer
to the light beam sensor. With regard to at least one
measurement spot being produced on a light beam sensor,
may be desirable for the light beam source configuration to
provide a high density of measurement spots when the light
beam source configuration is relatively further from the light
beam sensor.

As described above, in various implementations, a first
pattern of light beams BP1 and a second pattern of light
beams BP2 may be provided, wherein the first pattern of
light beams BP1 may have a lower density of first pattern
light beams BP1LB in relation to the second pattern of light
beams BP2 which may have a higher density of second
pattern light beams BP2LB. In various implementations, the
first and second patterns of light beams BP1 and BP2 may
be distinguishable from each other by having different
characteristics (e.g., different wavelengths, different circular
polarizations, different timings of transmission, etc.). An
implementation with different wavelengths is described
above with respect to FIG. 12, and implementations with
different circular polarizations are described above with
respect to FIGS. 14 and 15.

While preferred implementations of the present disclosure
have been illustrated and described, numerous variations in
the illustrated and described arrangements of features and
sequences of operations will be apparent to one skilled in the
art based on this disclosure. Various alternative forms may
be used to implement the principles disclosed herein. In
addition, the various implementations described above can
be combined to provide further implementations. All of the
U.S. patents and U.S. patent applications referred to in this
specification are incorporated herein by reference, in their
entirety. Aspects of the implementations can be modified, if
necessary to employ concepts of the various patents and
applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system for use with a movement system that moves an end tool, the movement system comprising:
- a movable configuration comprising an end tool mounting configuration that an end tool is configured to mount to; and
- a motion control system configured to control an end tool position and orientation, based at least in part on controlling the movable configuration so as to move at least a portion of an end tool that is mounted to the end tool mounting configuration within a movement volume, the metrology system comprising:
- a sensor configuration comprising a plurality of light beam sensors located at fixed positions, including at least a first light beam sensor at a first position and a second light beam sensor at a second position;
- a light beam source configuration that is configured to direct a first pattern of light beams and a second pattern of light beams to light beam sensors of the sensor configuration to indicate a position and orientation of the light beam source configuration, wherein:
    - the light beam source configuration is configured to be coupled to at least one of an end tool or the end tool mounting configuration;
    - at least some of the light beams that are directed to and received at the light beam sensors are configured to produce measurement spots in positions on the light beam sensors that cause the light beam sensors to produce corresponding measurement signals; and
    - the first pattern of light beams has a lower density of first pattern light beams in relation to the second pattern of light beams which has a higher density of second pattern light beams; and
- a processing portion configured to process the measurement signals from the light beam sensors of the sensor configuration to determine a position and orientation of the light beam source configuration,
    - wherein the metrology system is configured such that for at least a first position of the light beam source configuration that is a first distance from the first light beam sensor and a second distance from the second light beam sensor, with the second distance being greater than the first distance:
        - one or more first pattern light beams that are directed toward the first light beam sensor are utilized to cause the first light beam sensor to produce measurement signals for the processing by the processing portion, and second pattern light beams that are directed toward the first light beam sensor are not utilized to cause the first light beam sensor to produce measurement signals for the processing by the processing portion; and
        - one or more second pattern light beams that are directed toward the second light beam sensor are utilized to cause the second light beam sensor to produce measurement signals for the processing by the processing portion.

2. The metrology system of claim 1, wherein the first pattern light beams and the second pattern light beams have at least one different characteristic that enables the first pattern light beams to be distinguished from the second pattern light beams.

3. The metrology system of claim 2, wherein the at least one different characteristic is at least one of: a different wavelength; a different polarity; or a different timing of transmission.

4. The metrology system of claim 2, further comprising at least a first light beam selecting portion that is configured to operate based on the at least one different characteristic.

5. The metrology system of claim 4, wherein based at least in part on an indication of the first distance of the light beam source configuration from the first light beam sensor, the first light beam selecting portion is configured to prevent the second pattern light beams that are directed toward the first light beam sensor from being utilized to cause the first light beam sensor to produce measurement signals for the processing by the processing portion.

6. The metrology system of claim 5, wherein the first light beam selecting portion is configured to be utilized to at least one of block the second pattern light beams from reaching the first light beam sensor or prevent measurement signals resulting from the second pattern light beams at the first light beam sensor from the processing by the processing portion.

7. The metrology system of claim 5, wherein the at least one different characteristic between the first and second pattern light beams is at least one of a different wavelength or a different polarity, and the first light beam selecting portion comprises a first light beam filtering portion including at least one of a wavelength filter or a polarity filter that is configured to be moved in front of the first light beam sensor for blocking the second pattern light beams.

8. The metrology system of claim 7, further comprising at least a second light beam selecting portion that is configured to operate based on the at least one different characteristic and that comprises a second light beam filtering portion including at least one of a wavelength filter or a polarity filter, and for which the first and second light beam filtering portions are configured to be utilized for performing filtering for the first and second light beam sensors, respectively.

9. The metrology system of claim 1, wherein the metrology system is configured such that for at least a second position of the light beam source configuration that is a third distance from the first light beam sensor and a fourth distance from the second light beam sensor, with the third distance being greater than the fourth distance:
- one or more first pattern light beams that are directed toward the second light beam sensor are utilized to cause the second light beam sensor to produce measurement signals for the processing by the processing portion, and second pattern light beams that are directed toward the second light beam sensor are not utilized to cause the second light beam sensor to produce measurement signals for the processing by the processing portion; and
- one or more second pattern light beams that are directed toward the first light beam sensor are utilized to cause the first light beam sensor to produce measurement signals for the processing by the processing portion.

10. The metrology system of claim 1, wherein the light beam source configuration is configured to simultaneously direct the first pattern of light beams and the second pattern of light beams to the light beam sensors of the sensor configuration.

11. The metrology system of claim 1, wherein the motion control system is configured to provide position information which indicates with movement system accuracy a first distance of the light beam source configuration from the first light beam sensor, and based at least in part on the first distance as indicated by position information from the motion control system, the second pattern light beams that are directed toward the first light beam sensor are not utilized to cause the first light beam sensor to produce measurement signals for the processing by the processing portion.

12. The metrology system of claim 11, further comprising at least a first light beam selecting portion, wherein based at least in part on the first distance as indicated by position information from the motion control system, the first light beam selecting portion is configured to prevent the second pattern light beams that are directed toward the first light beam sensor from being utilized to cause the first light beam sensor to produce measurement signals for the processing by the processing portion.

13. The metrology system of claim 1, wherein each of the light beam sensors comprises a two dimensional position sensitive sensor, for which the measurement signals from the light beam sensors indicate the two dimensional positions of measurement spots on the light beam sensors that are produced by light beams.

14. The metrology system of claim 1, wherein a metrology frame volume is defined at least in part by the plurality of light beam sensors located at the fixed positions, for which the metrology frame volume is configured to surround at least part of the movement volume and the first and second light beam sensors are on opposite sides of the metrology frame volume.

15. The metrology system of claim 1, wherein the light beam source configuration comprises one or more diffractive optical elements and at least some of the light beams from the light beam source configuration are diffracted light beams.

16. The metrology system of claim 1, wherein:
the motion control system is configured to sense and control a position and orientation of the end tool with a level of accuracy defined as a movement system accuracy, based at least in part on sensing and controlling the position and orientation of the end tool using a plurality of position sensors included in the movable configuration; and
the processing portion is operable to determine a position and orientation of the end tool with an accuracy level that is better than the movement system accuracy, based at least in part on processing the measurement signals from the light beam sensors to determine a position and orientation of the light beam source configuration, and for which the position and orientation of the light beam source configuration are indicative of the position and orientation of the end tool.

17. The metrology system of claim 16, wherein:
for the first position of the light beam source configuration, the light beams directed by the light beam source configuration to the sensor configuration include a first pattern light beam, and a determination of which light beam sensor the first pattern light beam is directed to is based at least in part on a sensed position and orientation of the end tool as determined by utilizing the plurality of position sensors included in the movable configuration; and
the light beam sensor that the first pattern light beam is directed to is the first light beam sensor, and the processing portion is operable to determine the position and orientation of the end tool with an accuracy level that is better than the movement system accuracy, based at least in part on processing a first measurement signal from the first light beam sensor, for which the first measurement signal indicates a position of a first measurement spot as formed by the first pattern light beam on the first light beam sensor.

18. A method for operating a metrology system including a light beam source configuration, the method comprising:
operating the light beam source configuration to direct a first pattern of light beams and a second pattern of light beams to light beam sensors of a sensor configuration to indicate a position and orientation of the light beam source configuration, wherein:
the light beam source configuration is coupled to at least one of an end tool or an end tool mounting configuration of a movement system that moves the end tool;
the position and orientation of the light beam source configuration are indicative of a position and orientation of the end tool;
the sensor configuration comprises a plurality of light beam sensors located at fixed positions, including at least a first light beam sensor at a first position and a second light beam sensor at a second position;
at least some of the light beams that are directed to and received at the light beam sensors produce measurement spots in positions on the light beam sensors that cause the light beam sensors to produce corresponding measurement signals; and
the first pattern of light beams has a lower density of first pattern light beams in relation to the second pattern of light beams which has a higher density of second pattern light beams; and
processing the measurement signals from the light beam sensors of the sensor configuration to determine a position and orientation of the light beam source configuration, wherein:
for at least a first position of the light beam source configuration that is a first distance from the first light beam sensor and a second distance from the second light beam sensor, with the second distance being greater than the first distance:
one or more first pattern light beams that are directed toward the first light beam sensor are utilized to cause the first light beam sensor to produce measurement signals for the processing to determine the position and orientation, and second pattern light beams that are directed toward the first light beam sensor are not utilized to cause the first light beam sensor to produce measurement signals for the processing to determine the position and orientation; and
one or more second pattern light beams that are directed toward the second light beam sensor are utilized to cause the second light beam sensor to produce measurement signals for the processing to determine the position and orientation.

19. The method of claim 18, further comprising receiving position information from the movement system that moves the end tool, wherein the position information from the movement system indicates with movement system accuracy a first distance of the light beam source configuration from the first light beam sensor, and based at least in part on the first distance as indicated by position information from the movement system, the second pattern light beams that are directed toward the first light beam sensor are not utilized to cause the first light beam sensor to produce measurement signals for the processing to determine the position and orientation.

20. The method of claim 18, wherein:

for at least a second position of the light beam source configuration that is a third distance from the first light beam sensor and a fourth distance from the second light beam sensor, with the third distance being greater than the fourth distance:

one or more first pattern light beams that are directed toward the second light beam sensor are utilized to cause the second light beam sensor to produce measurement signals for the processing to determine the position and orientation, and second pattern light beams that are directed toward the second light beam sensor are not utilized to cause the second light beam sensor to produce measurement signals for the processing to determine the position and orientation; and one or more second pattern light beams that are directed toward the first light beam sensor are utilized to cause the first light beam sensor to produce measurement signals for the processing to determine the position and orientation.

21. A metrology system, comprising:

a sensor configuration comprising a plurality of light beam sensors located at fixed positions, including at least a first light beam sensor at a first position and a second light beam sensor at a second position;

a light beam source configuration that is configured to direct a first pattern of light beams and a second pattern of light beams to the light beam sensors of the sensor configuration to indicate a position and orientation of the light beam source configuration, wherein:

the light beam source configuration is configured to be coupled to at least one of an end tool or an end tool mounting configuration of a movement system that moves the end tool;

the position and orientation of the light beam source configuration are indicative of a position and orientation of the end tool;

at least some of the light beams that are directed to and received at the light beam sensors are configured to produce measurement spots in positions on the light beam sensors that cause the light beam sensors to produce corresponding measurement signals; and the first pattern of light beams has a lower density of first pattern light beams in relation to the second pattern of light beams which has a higher density of second pattern light beams; and a processing portion configured to process the measurement signals from the light beam sensors of the sensor configuration to determine a position and orientation of the light beam source configuration, wherein the metrology system is configured such that for at least a first position of the light beam source configuration that is a first distance from the first light beam sensor and a second distance from the second light beam sensor, with the second distance being greater than the first distance:

one or more first pattern light beams that are directed toward the first light beam sensor are utilized to cause the first light beam sensor to produce measurement signals for the processing by the processing portion, and second pattern light beams that are directed toward the first light beam sensor are not utilized to cause the first light beam sensor to produce measurement signals for the processing by the processing portion; and one or more second pattern light beams that are directed toward the second light beam sensor are utilized to cause the second light beam sensor to produce measurement signals for the processing by the processing portion.

* * * * *